(12) United States Patent
Park

(10) Patent No.: US 12,507,276 B2
(45) Date of Patent: Dec. 23, 2025

(54) RANDOM ACCESS METHOD AND APPARATUS FOR REDUCED CAPABILITY TERMINAL IN WIRELESS COMMUNICATION SYSTEM

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 416 days.

(21) Appl. No.: 18/050,459

(22) Filed: Oct. 27, 2022

(65) Prior Publication Data

US 2023/0085104 A1    Mar. 16, 2023

Related U.S. Application Data

(63) Continuation of application No. PCT/KR2021/005049, filed on Apr. 21, 2021.

(30) Foreign Application Priority Data

Apr. 29, 2020    (KR) .................. 10-2020-0051996

(51) Int. Cl.
*H04W 74/00* (2009.01)
*H04L 1/18* (2023.01)
*H04W 74/0833* (2024.01)
*H04W 74/0836* (2024.01)

(52) U.S. Cl.
CPC ............ *H04W 74/004* (2013.01); *H04L 1/18* (2013.01); *H04W 74/0833* (2013.01); *H04W 74/0836* (2024.01)

(58) Field of Classification Search
CPC ............ H04W 74/002; H04W 74/004; H04W 74/0833; H04W 74/0836; H04L 1/18
See application file for complete search history.

(56) References Cited

U.S. PATENT DOCUMENTS

| 2015/0117410 A1* | 4/2015 | Wu ........................ H04L 1/08 370/329 |
| 2015/0181533 A1* | 6/2015 | Chen .................. H04W 52/146 455/522 |
| 2016/0150570 A1 | 5/2016 | Wang et al. |
| 2016/0165640 A1 | 6/2016 | Yang et al. |

(Continued)

FOREIGN PATENT DOCUMENTS

| CN | 105409136 A | 3/2016 |
| KR | 10-2016-0114688 A | 10/2016 |

(Continued)

OTHER PUBLICATIONS

International Search Report for International Patent Application No. PCT/KR2021/005049, dated Aug. 6, 2021.

(Continued)

*Primary Examiner* — Jeong S Park

(57) ABSTRACT

A method for wireless communication between a plurality of devices includes determining the number of PUSCH repetition transmissions, determining a PUSCH transmission resource, based on random access-related configuration information and the number of PUSCH repetition transmissions, and performing the PUSCH repetition transmission based on the PUSCH transmission resource.

20 Claims, 29 Drawing Sheets

(56) References Cited

U.S. PATENT DOCUMENTS

| | | | |
|---|---|---|---|
| 2016/0353440 A1 | 12/2016 | Lee et al. | |
| 2017/0347361 A1* | 11/2017 | Tsuboi | H04W 72/54 |
| 2018/0084578 A1* | 3/2018 | Kato | H04W 74/006 |
| 2019/0274138 A1* | 9/2019 | Zhang | H04W 72/0446 |
| 2019/0342921 A1* | 11/2019 | Loehr | H04L 5/0053 |
| 2020/0187237 A1* | 6/2020 | Su | H04L 1/1896 |
| 2020/0367079 A1* | 11/2020 | Chen | H04W 72/046 |
| 2022/0070920 A1* | 3/2022 | Wei | H04W 74/0833 |
| 2023/0009933 A1* | 1/2023 | Li | H04W 72/1268 |
| 2023/0100666 A1* | 3/2023 | Mu | H04L 1/0003 370/329 |

FOREIGN PATENT DOCUMENTS

| | | |
|---|---|---|
| KR | 10-2017-0067725 A | 6/2017 |
| KR | 10-2017-0115933 A | 10/2017 |
| WO | 2017-030485 A1 | 2/2017 |
| WO | 2020/032618 A1 | 2/2020 |
| WO | 2020/060315 A1 | 3/2020 |

OTHER PUBLICATIONS

Written Opinion for International Patent Application No. PCT/KR2021/005049, dated Aug. 6, 2021.

Panasonic, "On PUSCH enhancements for NR URLLC", 3GPP TSG RAN WG1 #98bis, R1-1910521, Chongqing, China, Oct. 14-20, 2019, pp. 1-9.

Nokia et al., "Summary of contributions on PUSCH enhancements for NR eURLLC (AI 7.2.6.3)", 3GPP TSG-RAN WG1 Meeting #98bis, R1-1911402, Chongqing, China, Oct. 14-20, 2019, pp. 1-37.

"3rd Generation Partnership Project; Technical Specification Group Radio Access Network; NR; Physical layer procedures for control (Release 16)", Mar. 2020, pp. 1-156, 3GPP TS 38.213 V16.1.0, 3GPP Organizational Partners.

"3rd Generation Partnership Project; Technical Specification Group Radio Access Network; NR; NR and NG-RAN Overall Description; Stage 2 (Release 16)," Mar. 2020, pp. 1-133, 3GPP TS 38.300 V16.1.0, 3GPP Organizational Partners.

"3rd Generation Partnership Project; Technical Specification Group Radio Access Network; NR; Medium Access Control (MAC) protocol specification (Release 16)," Mar. 2020, pp. 1-141, 3GPP TS 38.321 V16.0.0, 3GPP Organizational Partners.

"3rd Generation Partnership Project; Technical Specification Group Radio Access Network; NR; Radio Resource Control (RRC) protocol specification (Release 16)," Mar. 2020, pp. 1-835, 3GPP TS 38.331 V16.0.0, 3GPP Organizational Partners.

Extended European Search Report for Applicant No. 21797827.9 from European Patent Office dated Mar. 15, 2024.

Intel Corporation: "Channel structure for 2-step RACH", 3GPP Draft; R1-1904280 Intel Channel Structure, 3rd Generation Partnership Project (3GPP), Mobile Competence Centre ; 650, Route Des Lucioles ; F-06921 Sophia-Antipolis Cedex ; France, vol. RAN WG1, No. Xi'an, China; Apr. 8, 2019-Apr. 12, 2019 Apr. 7, 2019 (Apr. 7, 2019), XP051699596.

Intel Corporation: "Channel structure for two-step RACH", 3GPP Draft; R1-1902466 Intel Channel Structure, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 25, 2019-Mar. 1, 2019 Feb. 16, 2019 (Feb. 16, 2019), XP051600162.

* cited by examiner

RANDOM ACCESS METHOD AND APPARATUS FOR REDUCED CAPABILITY TERMINAL IN WIRELESS COMMUNICATION SYSTEM

CROSS-REFERENCE TO RELATED APPLICATIONS

This application is a continuation of International patent application No. PCT/KR2021/005049, filed on Apr. 21, 2021, which claims priority from and the benefit of Korean Patent Application No. 10-2020-0051996, filed on Apr. 29, 2020, each of which is hereby incorporated by reference in its entirety.

BACKGROUND

The present disclosure relates to random access in a wireless communication system, and more particularly, to a random access method and apparatus for a reduced capability user equipment (UE) compared to a conventional UE. A 3rd Generation Partnership Project (3GPP) new radio (NR) system may support various numerologies related to a time-frequency resource unit standard in consideration of various scenarios, service requirements, potential system compatibility, and the like, to meet requirements for 5G communication. Also, to overcome a poor channel environment, such as high pathloss, phase-noise, and frequency offset, occurring on a high carrier frequency, the NR system may support transmission of a physical signal/channel through a plurality of beams. Through this, the NR system may support applications, for example, enhanced Mobile Broadband (eMBB), massive Machine Type Communications (mMTC)/ultra Machine Type Communications (uMTC), and Ultra Reliable and Low Latency Communications (URLLC). Here, mMTC, URLLC, and TSC may be associated with the use of evolved Internet of things (IoT) in consideration of the vertical industry. Such applications may be supported in the same network.

In the 3GPP NR system, discussion is ongoing to support new types of devices. For example, the new types of devices may include industrial wireless sensors, video surveillance, and wearable devices. Requirements for a service for such new types of devices have a characteristic higher than that of a low power wide area network (LPWAN) such as the conventional LTE-M (LTE-M) or narrow band-IoT (NB-IoT) but lower than that of eMBB or URLLC. Considering this, such a new type of a device may be referred to as a reduced capability (RC) device. In the 3GPP NR system, discussion is ongoing to support an RC UE. In particular, a specific method for a random access of the RC UE is not prepared.

SUMMARY

A technical objective of the present disclosure is to provide a new random access method and apparatus for reduced capability (RC) user equipment (UE) in a wireless communication system.

An additional technical objective of the present disclosure is to provide a method and apparatus for a random access repetition transmission.

An addition technical objective of the present disclosure is to provide for an uplink data channel repetition transmission associated with a random access preamble transmission.

Technical objectives achievable from the present disclosure are not limited to the aforementioned technical objectives and still other technical objects not described herein may be clearly understood by one of ordinary sill in the art to which the disclosure pertains from the following description.

A method of performing, by a user equipment (UE), a random access in a wireless communication system according to an aspect of the present disclosure may include receiving random access-related configuration information from a base station; determining at least one of the number of PRACH repetition transmissions and the number of PUSCH repetition transmissions; determining a PRACH transmission resource that includes at least one of a random access occasion (RO) for a PRACH repetition transmission, a RO set, the number of PRACH repetition transmissions, and the number of PUSCH repetition transmissions; determining a transmission resource that includes at least one of a RO for a PRACH repetition transmission, a RO set, a RO subset, and preamble information, based on the random access-related configuration information and the number of PRACH repetition transmissions; determining a PUSCH transmission resource that includes at least one of a PUSCH occasion (PO) for a PUSCH repetition transmission associated with the PRACH repetition transmission, a PO set, a PO subset, and PUSCH Demodulation Reference Signal (DMRS) information, based on the random access-related configuration information and the number of PUSCH repetition transmissions; and performing the PRACH repetition transmission and the PUSCH repetition transmission based on the PRACH transmission resource and the PUSCH transmission resource.

The above briefly summarized features for the present disclosure are example aspects of the following detailed description of the present disclosure and do not limit the scope of the present disclosure.

According to the present disclosure, it is possible to provide a new random access method and apparatus for reduced capability (RC) user equipment (UE) in a wireless communication system.

According to the present disclosure, it is possible to provide a method and apparatus for a random access preamble repetition transmission.

According to the present disclosure, it is possible to provide a method and apparatus for repetition transmission of an uplink data channel related to a random access preamble transmission.

Effects achievable from the present disclosure are not limited to the aforementioned effects and still other effects not described herein may be clearly understood by one of ordinary skill in the art to which the present disclosure pertains from the following description.

DETAILED DESCRIPTION

Figure 1:
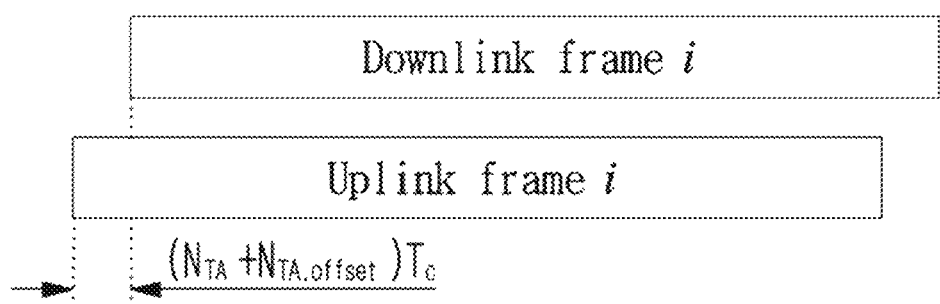
FIG. 1 illustrates a new radio (NR) frame structure to which the present disclosure may apply.

Various examples of the disclosure will be described more fully hereinafter with reference to the accompanying drawings such that one of ordinary skill in the art to which the present disclosure pertains may easily implement the examples. However, the present disclosure may be implemented in various forms and is not limited to the examples described herein.

When it is determined that detailed description related to a known configuration or function in describing the examples of the present disclosure, the detailed description is omitted. Also, a part irrelevant to the description of the disclosure is omitted and like reference numerals refer to like elements.

Herein, it will be understood that when an element is referred to as being "connected to", "coupled to", or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

Herein, the terms, such as first, second, and the like, may be used herein to describe elements in the description herein. The terms are used to distinguish one element from another element. Thus, the terms do not limit the element, an arrangement order, a sequence or the like. Therefore, a first element may be referred to as a second element in another element. Likewise, a second element may be referred to as a first element in another example.

Herein, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed element(s) is also included in the scope of the disclosure.

Herein, elements described in various examples may not be necessarily essential and may be partially selectable. Therefore, a partial set of elements described in an example is also included in the scope of the disclosure. Also, an example that additionally includes another element to elements described in various examples is also included in the scope of the disclosure.

The terms used in this disclosure are intended to describe a particular example and are not intended to limit the scope of claims. As used in the description of the examples and in the accompanying claims, the singular form is intended to include a plurality of forms as well, unless expressly indicated differently in context. In addition, the term "and/or" as used herein may refer to one of the related enumeration items, or means to refer to and include at least two or more of any and all possible combinations thereof.

The description described herein is related to a wireless communication network, and an operation performed in the wireless communication network may be performed in a process of controlling a network and transmitting data in a system that controls the wireless communication network (e.g., a base station), or may be performed in a process of transmitting or receiving a signal in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

The definitions of abbreviations used herein are as below
BSR: Buffer Status Report
CSI-RS: Channel State Information-Reference Signal
MAC: Medium Access Control
PDCCH: Physical Downlink Control Channel
PDSCH: Physical Downlink Shared Channel
PRACH: Physical Random Access Channel
RA: Random Access
RACH: Random Access Channel
RC: Reduced Capability or Reduced Complexity
RO: RACH Occasion or PRACH Occasion
RRC: Radio Resource Control
RSRP: Reference Signal Received Power
SCS: Sub-Carrier Spacing
SIB: System Information Block
SSB: Synchronization Signal Block 5G mobile communication technology may be defined by including the existing Long Term Evolution-Advanced (LTE-A) system as well as the aforementioned NR system. That is, the 5G system may include not only the case where the NR radio connection technology is applied alone, but also when the LTE series of wireless access technologies and NR radio access technologies are applied together. In addition, the 5G sidelink technology can include the sidelink technology to which the NR alone or both LTE series and the NR are applied together.

Hereinafter, the physical resource structure of the NR system will be described.

FIG. 1 illustrates NR frame structure to which the present disclosure may be applied.

In NR, a basic unit of a time domain may be $T_c=1/(\Delta f_{max} \cdot N_f)$. Here, $\Delta f_{max}=480 \cdot 10^3$ and $N_f=4096$. In LTE, a basic unit of a time domain may be $T_s=1/(\Delta f_{ref} N_{f,ref})$, $\Delta f_{ref}=15 \cdot 10^3$, and $N_{f,ref}=2048$. The constant for the multiple relationship between a NR time basic unit and a LTE time basic unit may be defined as $k=T_s/T_c=64$.

Referring to FIG. 1, a time structure of a frame for a downlink/uplink (DL/UL) transmission may include $T^f=(\Delta f_{max} N_f/100) \cdot T_s=10$ ms. Here, a single frame may include 10 subframes corresponding to $T_{sf}=(\Delta f_{max} N_f/100) \cdot T_s=1$ ms. The number of consecutive orthogonal frequency division multiplexing (OFDM) symbols per subframe may be $N_{symb}^{subframe,\mu}=N_{symb}^{slot}N_{slot}^{subframe,\mu}$. Also, each frame may be divided into two half frames and the half frames may include 0~4 subframes and 5~9 subframes. Here, half frame 1 may include 0~4 subframes and half frame 2 may include 5~9 subframes.

Referring to FIG. 1, $N_{TA}$ represents the timing advance (TA) between the downlink (DL) and the uplink (UL). Here, a transmission timing of uplink transmission frame i is determined based on a downlink reception timing at a UE according to the following Equation 1.

$$T_{TA}=(N_{TA}+N_{TA,offset})T \quad \text{[Equation 1]}$$

In Equation 1, $N_{TA,offset}$ denotes a TA offset value occurring due to a duplex mode difference and the like. Basically, in a frequency division duplex (FDD), $N_{TA,offset}=0$. In a time division duplex (TDD), $N_{TA,offset}$ may be defined as a fixed value by considering a margin for a DL-UL switching time.

Figure 2:
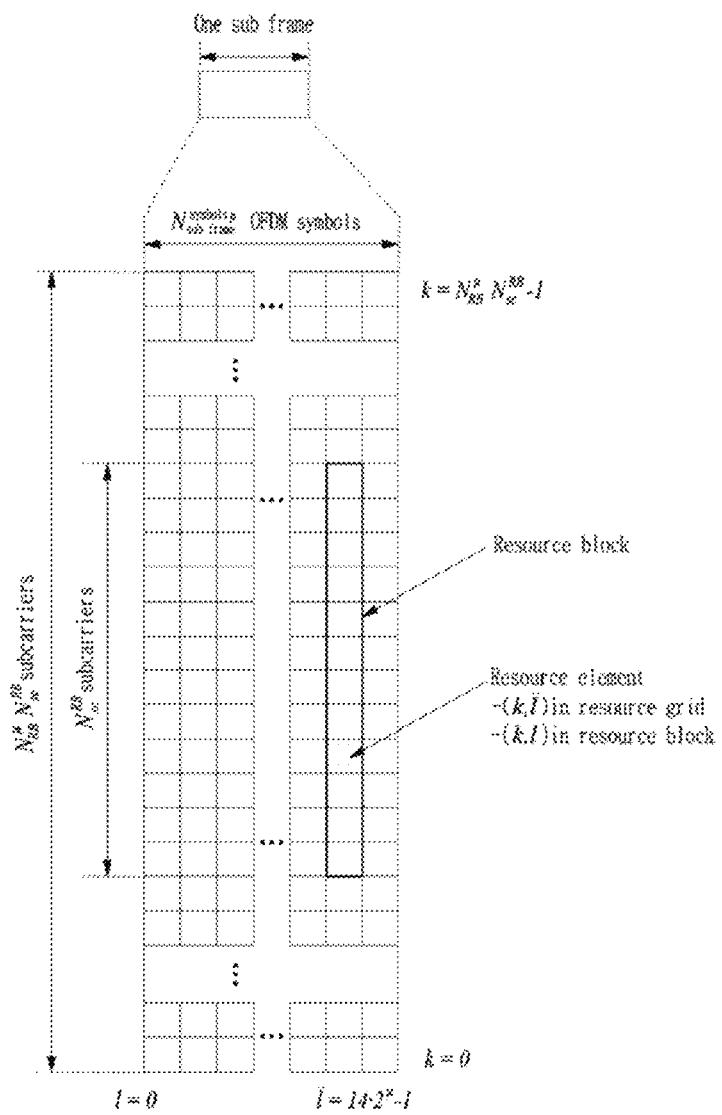
FIG. 2 illustrates an NR resource structure to which the present disclosure may apply.

FIG. 2 illustrates an example of a resource grid and a resource block.

Referring to FIG. 2, a resource element within a resource grid may be indexed based on each subcarrier spacing. Here, a single resource grid may be generated for each antenna port and for each subcarrier spacing. Uplink/downlink transmission and reception may be performed based on a corresponding resource grid.

A single resource block may be configured on a frequency domain using 12 resource elements and may configure an index $n_{PRB}$ for a single resource block every 12 resource elements. An index of the resource block may be used in a specific frequency band or system bandwidth. The index of the resource block may be defined as shown in following Equation 2. Herein, $N_{sc}^{RB}$ means the number of subcarriers per RB, and k means the subcarrier index.

$$n_{PRB} = \left\lfloor \frac{k}{N_{sc}^{RB}} \right\rfloor \quad \text{[Equation 2]}$$

Numerologies may be variously configured to meet various services and requirements of the NR system. Table 1 below shows an example of a numerology supported by the NR system.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Referring to the following Table 1, the numerologies may be defined based on an SCS, a cyclic prefix (CP) length, and the number of Orthogonal Frequency Division Multiplexing (OFDM) symbols per slot, which are used in an OFDM system. The aforementioned values may be provided to a UE through upper layer parameters, DL-BWP-mu and DL-BWP-cp (DL) and UL-BWP-mu and UL-BWP-cp (UL).

For example, referring to the following Table 1, if μ=2 and SCS=60 kHz, a normal CP and an extended CP may be applied. In other numerology indexes, only the normal CP may be applied.

Here, a normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for a length of another time section. Here, for coexistence and backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having the number of symbols less by at least one symbol than that of the normal slot. For example, in the case of providing a low latency such as an Ultra-Reliable and Low Latency Communications (URLLC) service, a latency may decrease through the non-slot having the number of slots less than that of the normal slot. Here, the number of OFDM symbols included in the non-slot may be determined based on a frequency range. For example, a non-slot with 1 OFDM symbol length may be considered in the frequency range of 6 GHz or more. As another example, the number of symbols used to define the non-slot may include at least two OFDM symbols. Here, the range of the number of OFDM symbols included in the non-slot may be configured with a length of a mini slot up to (normal slot length)−1. Here, although the number of OFDM symbols may be limited to 2, 4, or 7 as a non-slot standard, it is provided as an example only.

Also, for example, an SCS corresponding to μ=1 and 2 may be used in the unlicensed band of 6 GHz or less and an SCS corresponding to μ=3 and 4 may be used in the unlicensed band above 6 GHz. Here, for example, if μ=4, it may be used only exclusive for a synchronization signal block (SSB), which is described below.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows, in the case of normal CP, the number of OFDM symbols per slot ($N_{slot}^{symb,\mu}$), the number of slots per frame ($N_{slot}^{frame,\mu}$), and the number of slots per subframe ($N_{slot}^{subframe,\mu}$) for each SCS setting parameter μ. In Table 2, the values are based on the normal slot having 14 OFDM symbols.

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

Table 3 shows, in the case the extended CP may be applied (μ=2 and SCS=60 kHz), the number of slots per frame and the number of slots per subframe based on the normal slot of which the number of OFDM symbols per slot ($N_{slot}^{symb,\mu}$) is 12.

Downlink and uplink transmission for data or control transmission in a PHY layer is performed based on a slot unit and configured to be plural within a frame of 10 ms. A single slot may include 14 OFDM symbols in a normal CP and 12 OFDM symbols in an extended CP. The number of slots within 1 ms may be differently applied to a time axis according to a numerology subcarrier spacing. For example, if μ=0 of FIG. 2, it has a subcarrier spacing of 15 kHz, 1 slot within 1 ms, and 14 OFDM symbols. If μ=3, it has 8 slots at an interval of 0.125 ms within 1 ms, and 112 OFDM symbols. A mini slot enables a fast transmission by constituting the number of OFDM symbols as 2, 4, 7 to support the function of Ultra Reliable Low Latency Communication (URLLC) and by reducing a length of a slot.

Figure 3:
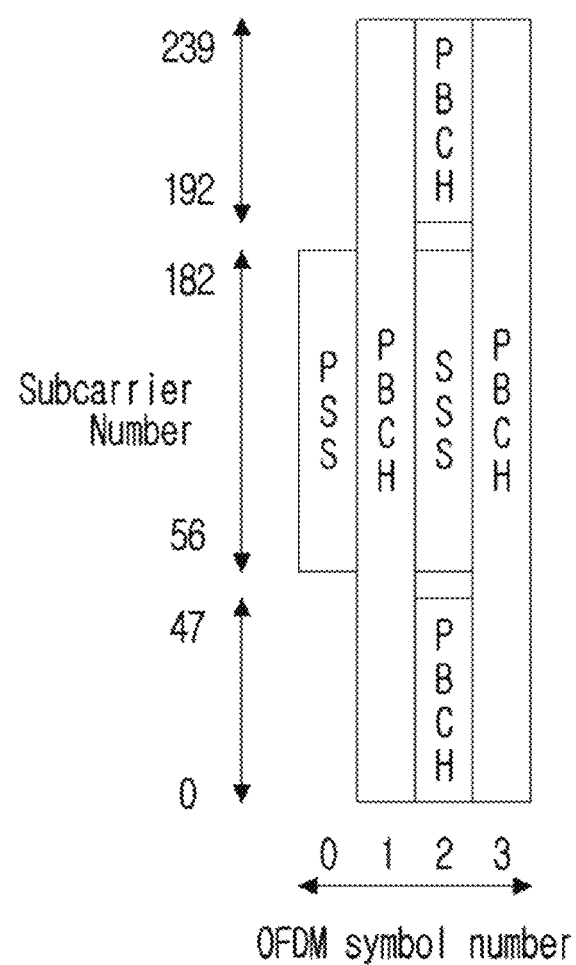
FIG. 3 illustrates a synchronization signal block to which the present disclosure may apply.

FIG. 3 illustrates a synchronization signal block to which the present disclosure may apply.

A synchronization signal block (SSB) may include a synchronization signal (SS) and a Physical Broadcast Channel (PBCH). The SS may include a primary SS (PSS) and a secondary SS (SSS). The PBCH may include a PBCH demodulation reference signal (DMRS) and PBCH data (or a PBCH payload).

Referring to FIG. 3, a single SSB may be defined as 4 OFDM symbols in a time domain and 240 consecutive subcarriers (or 20 RBs) in a frequency domain. The PSS may be transmitted in 127 subcarriers at a defined location of a first symbol and the SSS may be transmitted at the same subcarrier location as that of the PSS in a third symbol. In the second symbol, the third symbol, and the fourth symbol, the PBCH may be transmitted. In the third symbol, 144 subcarriers may include the SSS and a guard band. Here, the SSS may be positioned in 127 subcarriers. That is, in the third symbol, the PBCH may be positioned in 48 subcarriers spaced apart by a guard band of 8 subcarriers in a low frequency direction based on the SSS and 48 subcarriers spaced apart by a guard band of 9 subcarriers in a high frequency direction. The PBCH DMRS may be mapped to every 4 subcarriers in an area indicated by the PBCH in FIG. 3 and may be shifted in a frequency direction according to a physical cell identifier (PCI) value.

The SSB may include a first type in which an SCS of 15 kHz or 30 kHz is applied in frequency range 1 (FR1) of 6 GHz or less and a second type in which an SCS of 120 kHz or 240 kHz is applied in frequency range 2 (FR2) of above 6 GHz.

In a time domain, the SSB may be transmitted based on a predetermined transmission pattern. A single synchronization signal burst set (SS burst set) may include at least one burst and a single burst may include at least one SSB. Transmission of the SSB within a single burst set may be limited to a section of 5 ms (e.g., a half-frame) and the burst set may be periodically repeated. A maximum number of SS blocks in a single burst set may differ according to a frequency band. In the case of supporting multi-beam sweeping, SSBs in a single burst set may correspond to different beams, respectively. Also, an SSB location in the time domain may vary based on a subcarrier spacing according to a numerology.

In an initial cell search stage, a UE may perform downlink synchronization with a corresponding base station by detecting and using a PSS, an SSS, a PBCH DMRS and PBCH data (or PBCH payload) included in an SSB transmitted from the base station. For example, the UE may detect the PSS and may determine a transmission timing of the SSS and a PCI candidate of a detected cell, and may detect the SSS and may determine a PCI of the corresponding cell. Also, the UE may determine an SSB time index based on the PBCH DMRS (or PBCH DMRS and PBCH data) and may acquire, from the PBCH data, a master information block (MIB) that includes a system frame number (SFN), a parameter required for decoding system information block 1 (SIB1), and the like.

Hereinafter, a random access procedure in an NR system related to the present disclosure is described.

Initially, a PRACH configuration is described.

A location at which an RA preamble transmission is possible in the time domain and a preamble format may be determined according to a prach-ConfigurationIndex parameter configured in an upper layer. The UE may be aware of the number of PRACH slots that are configured in a specific symbol in the specific frame number based on information included in dedicated RRC signaling or SIB1, and may be aware of the number of RACH occasions (RO) per PRACH slot. Also, the UE may be aware of a location of a PRACH frequency resource in a frequency domain from an msg1-FrequencyStart parameter and may be aware of the number of PRACH frequency resources from msg1-FDM.

Table 4 shows an example information indicated when a PRACH configuration index is 0 in FR2 (e.g., 24250 to 52600 MHz).

TABLE 4

| PRACH Config. Index | Preamble format | n_SFN mod x = y | | Slot number | Starting symbol | Number of PRACH slots within a 60 kHz slot | $N\_t^{RA,slot}$, number of time-domain PRACH occasion within a PRACH slot | $N\_dur^{RA}$, PRACH duration |
|---|---|---|---|---|---|---|---|---|
| | | x | y | | | | | |
| 0 | A1 | 16 | 1 | 4,9,14,19, 24,29,34, 39 | 0 | 2 | 6 | 2 |

The preamble format may include long preamble 0 having 839 sequences and short preambles A1, A2, A3, B1, B2, B3, B4, C0, and C2 having 0, 1, 2, 3, and 139 sequences. For example, if PRACH configuration index=0, it may indicate that a short preamble format of A1 is applied.

Also, $n_{SFN}$ mod x=y may indicate a frame number in which a PRACH slot is present and may indicate that a PRACH slot is present in a frame number that satisfies a y value within an x period. For example, if PRACH configuration index=0, x=16 and y=1. Therefore, the PRACH slot may be configured in frames 1, 17, 34, . . . .

The slot number represents a slot number in which the PRACH slot is configured within a frame indicated by $n_{SFN}$ mod x=y. For example, if PRACH configuration index=0, the PRACH slot may be configured in slots 4, 9, 14, 19, 24, 29, 34, and 39 in each of the frames 1, 17, 34, . . . .

The starting symbol represents an OFDM symbol number in which the PRACH slot is configured within a slot indicated by the slot number. For example, if PRACH configuration index i=0, the PRACH slot may be configured from a zero-th OFDM symbol in each of the slots 4, 9, 14, 19, 24, 29, 34, and 39 in each of the frames 1, 17, 34, . . . .

The number of PRACH slots within a 60 kHz slot represents the number of PRACH slots that are configured in the slot indicated by the slot number. For example, if PRACH configuration index=0, two PRACH slots may be configured in each of the slots 4, 9, 14, 19, 24, 29, 34, and 39 in each of the frames 1, 17, 34, . . . .

The number of time-domain PRACH occasions within a PRACH slot or $N_t^{RA,slot}$ represents the number of time-domain ROs within a single PRACH slot. For example, if PRACH configuration index=0, 6 time-domain ROs may be configured per a PRACH slot.

A PRACH duration or $N_{dur}^{RA}$ represents the number of OFDM symbols occupied by the indicated preamble format. For example, if PRACH configuration index=0, the short preamble format of A1 may be present in two OFDM symbols.

Figure 4:
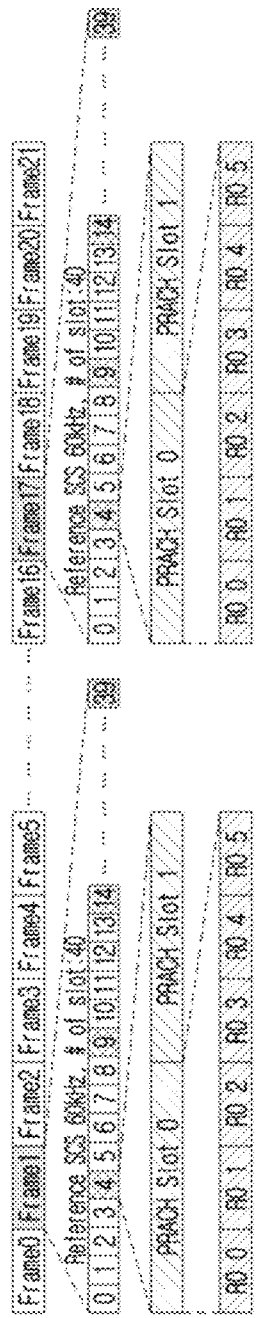
FIG. 4 illustrates an example of a PRACH configuration to which the present disclosure may apply.

FIG. 4 illustrates an example of a PRACH configuration to which the present disclosure may apply.

The example of FIG. 4 shows a frame in which a PRACH slot is present, a slot, the number of PRACH slots, and the number of ROs when the PRACH configuration index is 0 in Table 4.

The following Equation 3 refers to an equation for inducing an OFDM symbol number in which a PRACH slot is configured and an OFDM symbol in which RO is configured.

Start symbol number$(l) = l_0 + n_t^{RA} N_{dur}^{RA} + 14 n_{slot}^{RA}$
where SCS: 1.25, 5, 15, 60 kHz: $n_{slot}^{RA}=0$,
SCS: 30, 120 kHz: $n_{slot}^{RA}=1$    [Equation 3]

In Equation 3, $l_0$ denotes a start location of a symbol and $n_t^{RA}$ denotes $N_t^{RA,slot}$ numbers starting from 0. For example, if PRACH configuration index=0, $N_t^{RA,slot}=6$ and $n_t^{RA}=\{0, 1, 2, 3, 4, 5\}$.

Also, in a PRACH configuration table, such as Table 4, a slot number is determined based on 60 kHz and 15 kHz that are reference subcarrier spacings. Therefore, a symbol number needs to be allocated according to an actual subcarrier spacing. Therefore, if subcarrier spacing=1.25. 5, 15, 60 kHz, $n_{slot}^{RA}=0$, if subcarrier spacing=30, 120 kHz $n_{slot}^{RA}=1$ and the PRACH slot is configured after 14 symbols, that is, in a subsequent slot. For example, if PRACH configuration index=0 and subcarrier spacing=120 kHz, a time-domain RO may be configured in OFDM symbol numbers 0, 2, 4, 6, 8, 10, 14, 16, 18, 20, 22, and 24 according to Equation 3.

Figure 5:
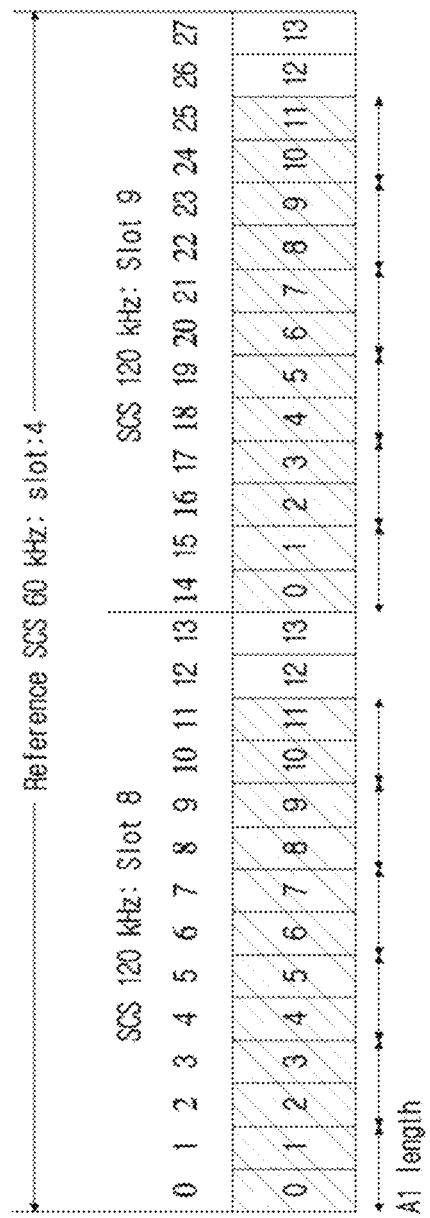
FIG. 5 illustrates an additional example of a PRACH configuration to which the present disclosure may apply.

FIG. 5 illustrates an additional example of a PRACH configuration to which the present disclosure may apply.

The example of FIG. 5 shows a location of an OFDM symbol in which a RO is present if PRACH configuration index=0 and subcarrier spacing (SCS)=120 kHz.

Table 5 shows an example of the number of PRACH configuration periods for a single association period.

TABLE 5

| PRACH configuration period (msec) | Association period (number of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

In Table 5, the PRACH configuration period corresponds to an x value of Table 4 and x is defined in units of a frame (i.e., 10 ms) and a PRACH may be configured every x*10 ms. For example, if PRACH configuration index=0, x=16 and thus, 160 msec PRACH configuration period of Table 5 may be applied.

The association period represents the number of PRACH configuration periods in which a valid SSB and a valid RO are associated at least once. That is, the association period represents a set of applicable association periods per PRACH configuration period.

Figure 6:
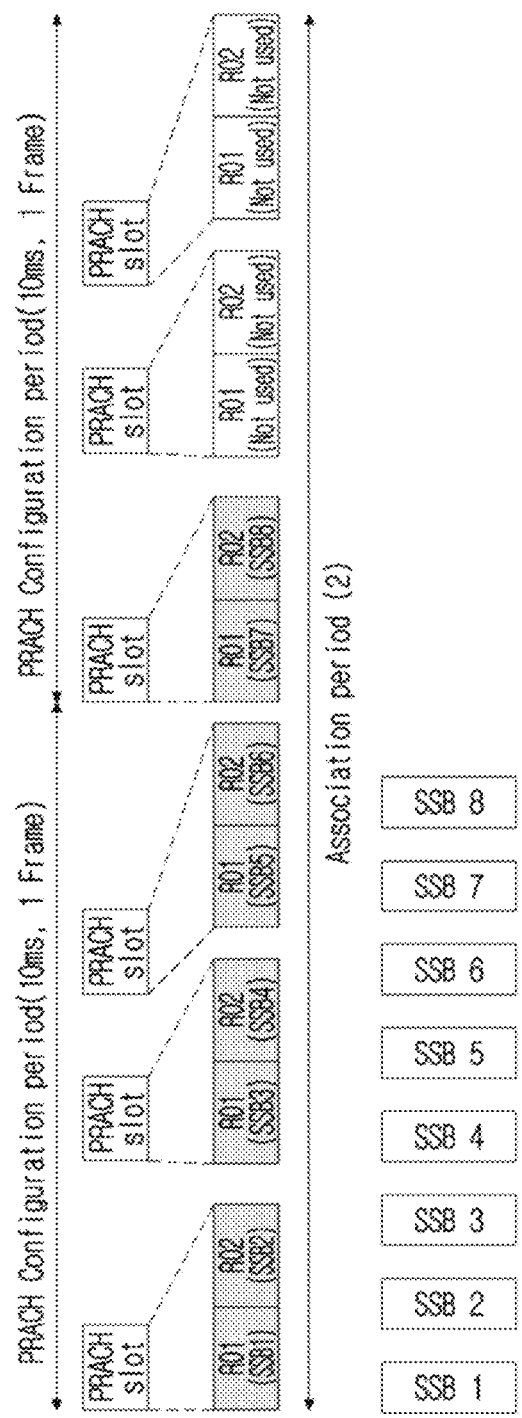
FIG. 6 illustrates an example of an association period to which the present disclosure may apply.

FIG. 6 illustrates an example of an association period to which the present disclosure may apply.

The example of FIG. 6 represents a case in which, if PRACH configuration period=10 ms (i.e., a single frame), three PRACH slots are configured and two ROs are configured for each PRACH slot. A valid SSB is associated with a RO by an upper layer parameter. In the example of FIG. 6, the valid SSB and the valid RO are associated based on 1:1. An index of the valid SSB (i.e., actual transmitted SSB) is provided to a UE according to an upper layer configuration from a base station. In the following description, the described SSB corresponds to the valid SSB or the actual transmitted SSB. In the example of FIG. 6, since there are two configuration periods each in which all SSBs are associated with ROs at least once, it corresponds to a case in which association period=2. A RO not associated with any SSB is not used.

Table 6 shows an example of RACH-ConfigCommon information element (IE).

TABLE 6

RACH-ConfigCommon information element-- ASN1START-- TAG-RACH-CONFIGCOMMON-STARTRACH-ConfigCommon ::=SEQUENCE {rach-ConfigGeneric RACH-ConfigGeneric,totalNumberOfRA-Preambles INTEGER(1..63) OPTIONAL, -- Need S ssb-perRACH-OccasionAndCB-PreamblesPerSSB CHOICE { oneEighth ENUMERATED {n4,n8,n12,n16,n20,n24,n28,n32,n36,n40,n44,n48,n52,n56,n60,n64}, oneFourth ENUMERATED {n4,n8,n12,n16,n20,n24,n28,n32,n36,n40,n44,n48,n52,n56,n60,n64}, oneHalf ENUMERATED {n4,n8,n12,n16,n20,n24,n28,n32,n36,n40,n44,n48,n52,n56,n60,n64}, one ENUMERATED {n4,n8,n12,n16,n20,n24,n28,n32,n36,n40,n44,n48,n52,n56,n60,n64}, two ENUMERATED {n4,n8,n12,n16,n20,n24,n28,n32}, four INTEGER (1..16), eight INTEGER (1..8), sixteen INTEGER (1..4)} OPTIONAL, -- Need M groupBconfigured SEQUENCE {ra-Msg3SizeGroupA ENUMERATED {b56, b144, b208, b256, b282, 6480, 6640, 6800, b1000, 672, spare6, spare5,spared4, spare3, spare2, spare1}, messagePowerOffsetGroupB ENUMERATED { minusinfinity, dB0, dB5, dB8, dB10, dB12, dB15, dB18}, numberOfRA-PreamblesGroupA INTEGER (1..64)} OPTIONAL, -- Need R ra-ContentionResolutionTimer ENUMERATED { sf8, sf16, sf24, sf32, sf40, sf48, sf56, sf64}, rsrp-ThresholdSSB RSRP-Range OPTIONAL, -- Need R rsrp-ThresholdSSB-SUL RSRP-Range OPTIONAL, -- Cond SUL prach-RootSequenceIndex CHOICE {l839 INTEGER (0..837), l139 INTEGER (0..137)}, msg1-SubcarrierSpacing SubcarrierSpacing OPTIONAL, -- Cond L139 restrictedSetConfig ENUMERATED {unrestrictedSet, restrictedSetTypeA, restrictedSetTypeB}, msg3-transformPrecoder ENUMERATED {enabled}OPTIONAL, -- Need R ...} -- TAG-RACH-CONFIGCOMMON-STOP -- ASN1STOP The RACH-ConfigCommon IE of Table 6 includes information for 4-step RACH that is provided to the UE through SIB1.

Here, the parameter, totalNumberofRA-Preambles, denotes the number of preambles available for Contention-Based Random Access (CBRA) and Contention-Free Random Access (CFRA) excluding a preamble allocated for system information (SI) request. If a value of the parameter is absent, all of 64 preambles may be used for RA.

Next, the parameter, ssb-perRACH-OccasionAndCB-PreamblesPerSSB, has two meanings. If a value of the parameter is oneEight (⅛), oneFourth (¼), oneHalf (½), one (1), two (2), four (4), eight (8), sixteen (16), it indicates N corresponding to the number of SSBs per RO (i.e., ssb-perRACH-Occasion) and ENUMERATED according thereto indicates R corresponding to the number of CB preambles per SSB (i.e., CB-PreamblesPerSSB). For example, if the value of the parameter is oneEight (⅛), a single SSB is mapped to eight ROs. If the value of the parameter=eight (8), eight SSBs are mapped to a single RO. In ENUMERATED, nx represents having x CB preambles per an SSB. For example, if ssb-perRACH-Occasion=sixteen (16), the number of CB preambles available for a single SSB may be 1 to 4. If ssb-perRACH-Occasion=4, it represents that all of 64 preambles are used for CBRA. That is, the UE may perform an SSB-to-RO association according to values of N and R. If N<1, the SSB may be associated with 1/N consecutive ROs and CB preambles starting from preamble number 0 to R are allocated. If N>1, R CB preambles are allocated from a start number of related SSB n according to the following Equation 4.

$$\text{Preamble start index} = \frac{n \cdot N_{Preamble}^{Total}}{N}, \quad \text{[Equation 4]}$$

where $n: 0 \leq n \leq N - 1$, $N_{Preamble}^{Total}$ = multiple of $N$

In addition, the RACH-ConfigCommon IE may further include a parameter for preamble group B, a timer for contention resolution, SSB RSRP, RootSequenceIndex for determining a PRACH sequence, subcarrier spacing information, and the like.

Figure 7:
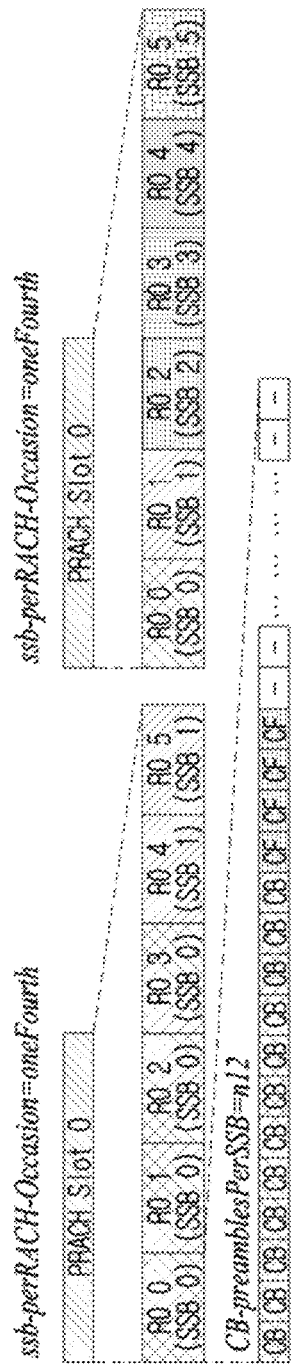
FIG. 7 illustrates an example of an association of SSB and RO to which the present disclosure may apply.

FIG. 7 illustrates an example of an association of SSB and RO to which the present disclosure may apply.

If a value corresponding to N or ssb-perRACH-Occasion is oneFourth (¼), it represents that a single SSB is associated with four ROs. If a value corresponding to R or CB-PreamblesPerSSB is n12, it represents that 12 preambles are used for CBRA. Therefore, in the example of FIG. 7, if ssb-perRACH-Occasion=oneFourth, SSB0 is associated with ROs 0, 1, 2, and 3 and 12 CB preambles are configured in each of the four ROs.

If a value corresponding to N or ssb-perRACH-Occasion=one (1), it represents that a single SSB is associated with a single RO. The number of CB preambles in each RO may be determined according to a value corresponding to R or CB-PreamblesPerSSB.

Figure 8:
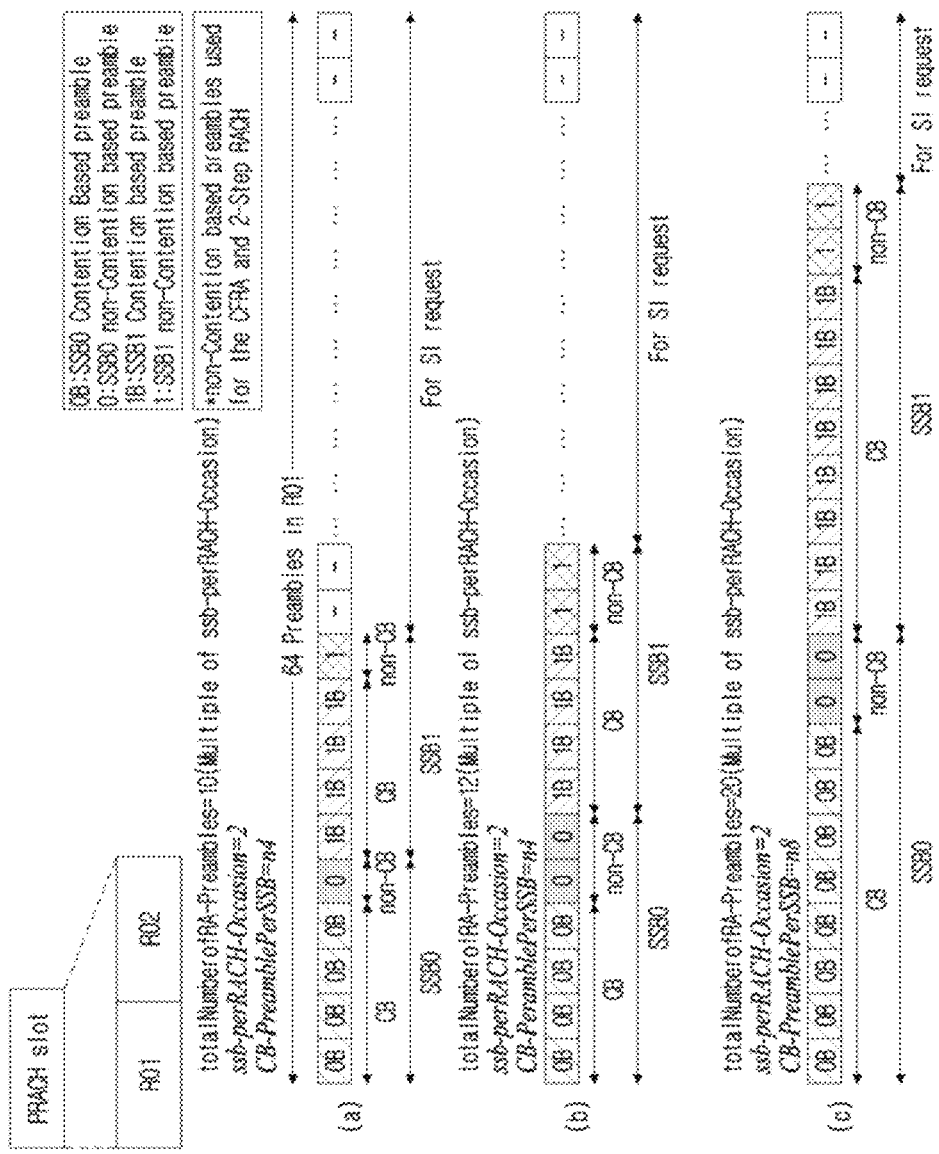
FIG. 8 illustrates an example of a 4-step RACH configuration to which the present disclosure may apply.

FIG. 8 illustrates an example of a 4-step RACH configuration to which the present disclosure may apply.

An example of FIG. 8(a) represents a case in which totalNumberofRA-Preambles is 10, two SSBs are associated for each RO, and the number of CB preambles for each SSB is 4. A preamble start number is assigned for each SSB based on totalNumberofRA-Preambles($N^{Total}_{Preamble}$), which is the number of preambles available for each RO and the number of SSBs for each RO, and the number of SSBs for each RO. Therefore, in the example of FIG. 8(a), a preamble start number for SSB0 is 0 and a preamble start number for SSB1 is 5. The number of CB preambles corresponding to CB-PreamblePerSSB are allocated from a preamble start number for each SSB. Since a total number of preambles is 10 and two SSBs are associated with a single RO, five preambles may be used for each SSB. Since four CB preambles are configured for each SSB, a remaining single preamble is configured as a non-CB preamble. A single non-CB preamble not allocated as a CB preamble to each SSB may be used for a CF preamble or a 2-step random access.

An example of FIG. 8(b) represents a case in which totalNumberofRA-Preambles is 12, two SSBs are associated for each RO, and the number of CB preambles for each SSB is 4. Since six preambles are available and four CB preambles are configured for each SSB, two preambles may be used for CF or 2-step RACH.

An example of 8(c) represents a case in which totalNumberofRA-Preambles is 20, two SSBs are associated for each RO, and the number of CB preambles for each SSB is 8. Since ten preambles are available for each SSB and eight CB preambles are configured, two preambles may be used for CF or 2-step RACH.

Table 7 shows an example of RACH-ConfigCommonTwoStepRA IE.

TABLE 7

```
RACH-ConfigCommonTwoStepRA information element
-- ASN1START
-- TAG-RACH-CONFIGCOMMONTWOSTEPRA-START
RACH-ConfigCommonTwoStepRA-r16 ::=         SEQUENCE {
    rach-ConfigGenericTwoStepRA-r16        RACH-ConfigCommonTwoStepRA-
r16,
    msgA-TotalNumberOfRA-Preambles-r16     INTEGER (1..63)
OPTIONAL, -- Need S
    msgA-SSB-PerRACH-OccasionAndCB-PreamblesPerSSB-r16    CHOICE {
        oneEighth                          ENUMERATED
{n4,n8,n12,n16,n20,n24,n28,n32,n36,n40,n44,n48,n52,n56,n60,n64},
        oneFourth                          ENUMERATED
{n4,n8,n12,n16,n20,n24,n28,n32,n36,n40,n44,n48,n52,n56,n60,n64),
        oneHalf                            ENUMERATED
{n4,n8,n12,n16,n20,n24,n28,n32,n36,n40,n44,n48,n52,n56,n60,n64},
        one                                ENUMERATED
{n4,n8,n12,n16,n20,n24,n28,n32,n36,n40,n44,n48,n52,n56,n60,n64},
        two                                ENUMERATED
{n4,n8,n12,n16,n20,n24,n28,n32},
        four                               INTEGER (1..16),
        eight                              INTEGER (1..8),
        sixteen                            INTEGER (1..4)
    }                                                        OPTIONAL, -- Cond
2StepOnly
    msgA-CB-PreamblesPerSSB-PerSharedRO-r16         INTEGER (1..60)
OPTIONAL, -- Cond SharedRO
    msgA-SSB-SharedRO-MaskIndex-r16                 INTEGER (1..15)
OPTIONAL, -- Need S
    groupB-ConfiguredTwoStepRA-r16                  GroupB-ConfiguredTwoStepRA-r16
OPTIONAL, -- Need S
    msgA-PRACH-RootSequenceIndex-r16                CHOICE {
        l839                               INTEGER (0..837),
        l139                               INTEGER (0..137)
    }                                                        OPTIONAL, -- Cond
2StepOnly
    msgA-RSRP-Threshold-r16                RSRP-Range
OPTIONAL, -- Cond 2Step4Step
    msgA-RSRP-ThresholdSUL-r16             RSRP-Range
OPTIONAL, -- Cond 2StepSUL
    msgA-RSRP-ThresholdSSB-r16             RSRP-Range
OPTIONAL, -- Need S
    msgA-RSRP-ThresholdSSB-SUL-r16         RSRP-Range
OPTIONAL, -- Cond 2StepSUL
    msgA-SubcarrierSpacing-r16             SubcarrierSpacing
OPTIONAL, -- Cond 2StepOnlyL139
    msgA-RestrictedSetConfig-r16           ENUMERATED {unrestrictedSet,
restrictedSetTypeA,
                                           restrictedSetTypeB}       OPTIONAL, -
- Cond 2StepOnly
    ra-PrioritizationForAccessIdentityTwoStep-r16   SEQUENCE {
        ra-Prioritization-r16              RA-Prioritization
OPTIONAL, -- Need M
        ra-PrioritizationForAI-r16         BIT STRING (SIZE (2))
OPTIONAL -- NeedM
    }                                                        OPTIONAL, -- Need
R
    ra-ContentionResolutionTimer-r16       ENUMERATED {sf8, sf16, sf24, sf32,
sf40, sf48, sf56, sf64} OPTIONAL, -- Cond 2StepOnly
    ...
}
GroupB-ConfiguredTwoStepRA-r16 ::=         SEQUENCE {
    ra-MsgA-SizeGroupA                     ENUMERATED {b56, b144, b208, b256,
```

TABLE 7-continued

```
b282, 6480, 6640, 6800,
                               b1000, b72, spared, spared, spared, spare3,
spare2, spare1} OPTIONAL, -- Need M
   messagePowerOffsetGroupB        ENUMERATED {minusinfinity, dB0,
dB5, dB8, dB10, dB12, dB15, dB18{ OPTIONAL, -- NeedM
   numberofRA-PreamblesGroupA      INTEGER (1..64)
}
-- TAG-RACH-CONFIGCOMMONTWOSTEPRA-STOP
-- ASN1STOP
```

The RACH-ConfigCommonTwoStepRA IE of Table 7 includes information for 2-step RACH.

If an IE for 4-step RACH is configured in a bandwidth part (BWP) set for the UE, the parameter, msgA-SSB-PerRACH-OccasionAndCB-PreamblesPerSSB-r16, for 2-step RACH (i.e., information indicating a preamble transmitted from the UE, the number of SSBs for each RO and the number of CB preambles for each SSB applied to MsgA corresponding to an uplink message in 2-step RACH) may be omitted. On the contrary, unless the IE for 4-step RACH is configured, the corresponding parameter needs to be included.

Next, the parameter, msgA-CB-PreamblesPerSSB-PerSharedRO-r16, indicates the number of CB preambles for 2-step RACH if the 4-step RACH and the 2-step RACH simultaneously use the same RO. In this case, the number of preambles for the 2-step RACH among the remaining (or, CF preambles) excluding the number of CB preambles for the 4-step RACH may be indicated by the parameter. Here, the number of CB preambles for the 2-step RACH should not exceed a value acquired by subtracting the number of CB preambles for the 4-step RACH from the number of preambles per SSB.

Also, the parameter, msgA-SSB-SharedRO-MaskIndex-r16, indicates a number of RO shared by the 4-step RACH and the 2-step RACH and may be configured as shown in the following Table 8. If a value of the parameter is 0, all ROs are shared. If the value of the parameter is 1 to 8, a RO of a corresponding index is shared. If the value of the parameter is 9, every even RO is shared. If the value of the parameter is 10, every odd RO is shared.

TABLE 8

| PRACH Mask Index | Allowed PRACH Occasion(s) of SSB |
| --- | --- |
| 0 | All |
| 1-8 | PRACH Occasion index 1-8 |
| 9 | Every even PRACH Occasion |
| 10 | Every odd PRACH Occasion |

Figure 9:
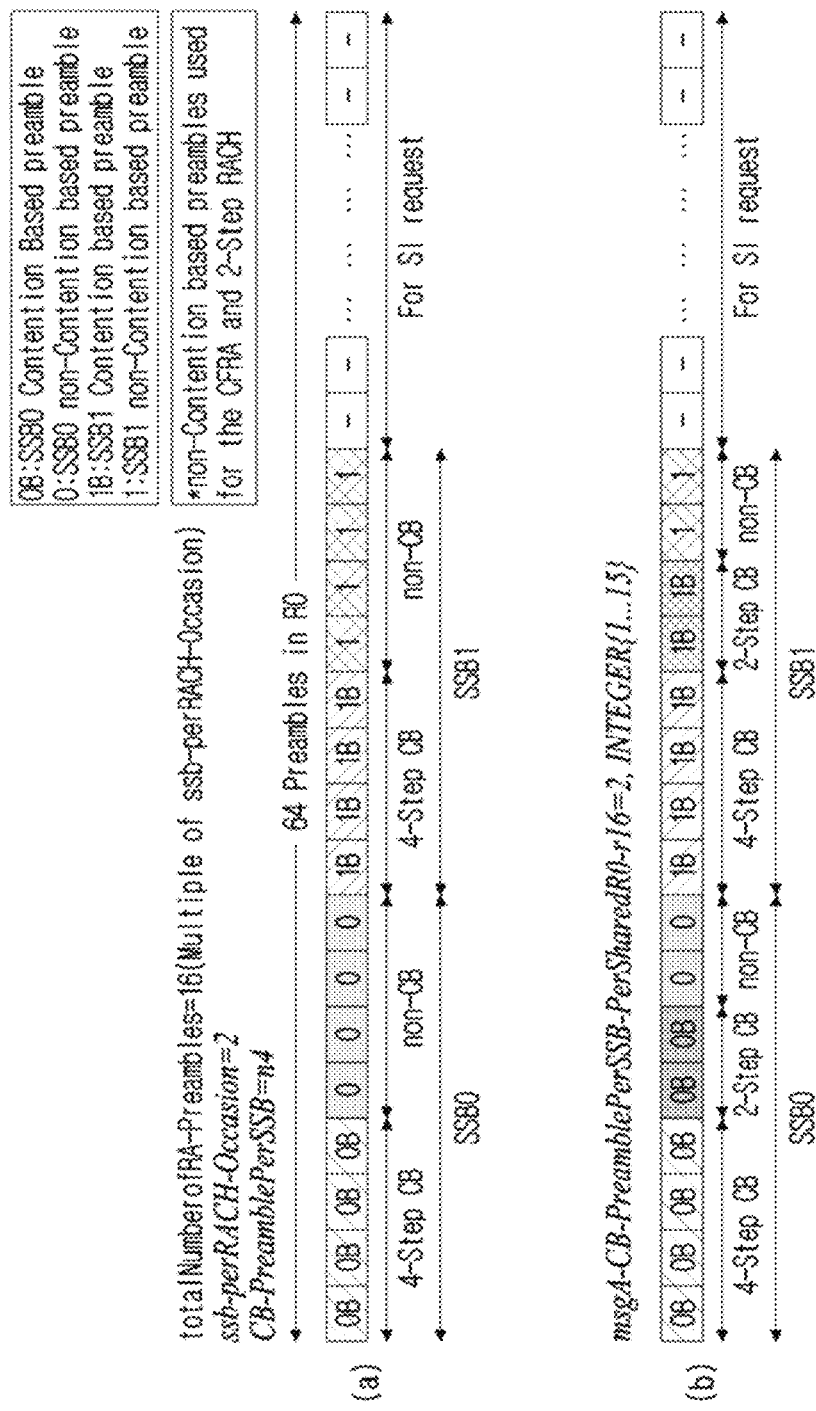
FIG. 9 illustrates an example of a 2-step RACH configuration to which the present disclosure may apply.

FIG. 9 illustrates an example of a 2-step RACH configuration to which the present disclosure may apply.

An example of FIG. 9(a) represents an example in which a value of totalNumberofRA-Preambles is 16, the number of SSBs for each RO is 2, and the number of CB preambles for SSB is 4 by the 4-step RACH configuration. In this case, eight preambles may be used for each SSB and, here, four preambles may be used as CB preambles and the remaining four preambles may be used as non-CB or CF preambles.

In an example of FIG. 9(b), it is assumed that the same RO as RO for the 4-step RACH is shared for 2-step RACH by the 2-step RACH configuration. In this case, within remaining (i.e., non-CB) preambles excluding a CB preamble for 4-step RACH for each SSB, a CB preamble for 2-step RACH may be configured by a value of the parameter, msgA-CB-PreamblesPerSSB-PerSharedRO-r16. For example, if the value of the parameter is 2, two preambles may be allocated as CB preambles for the 2-step RACH for each SSB among four non-CB preambles for 4-step RACH.

Figure 10:
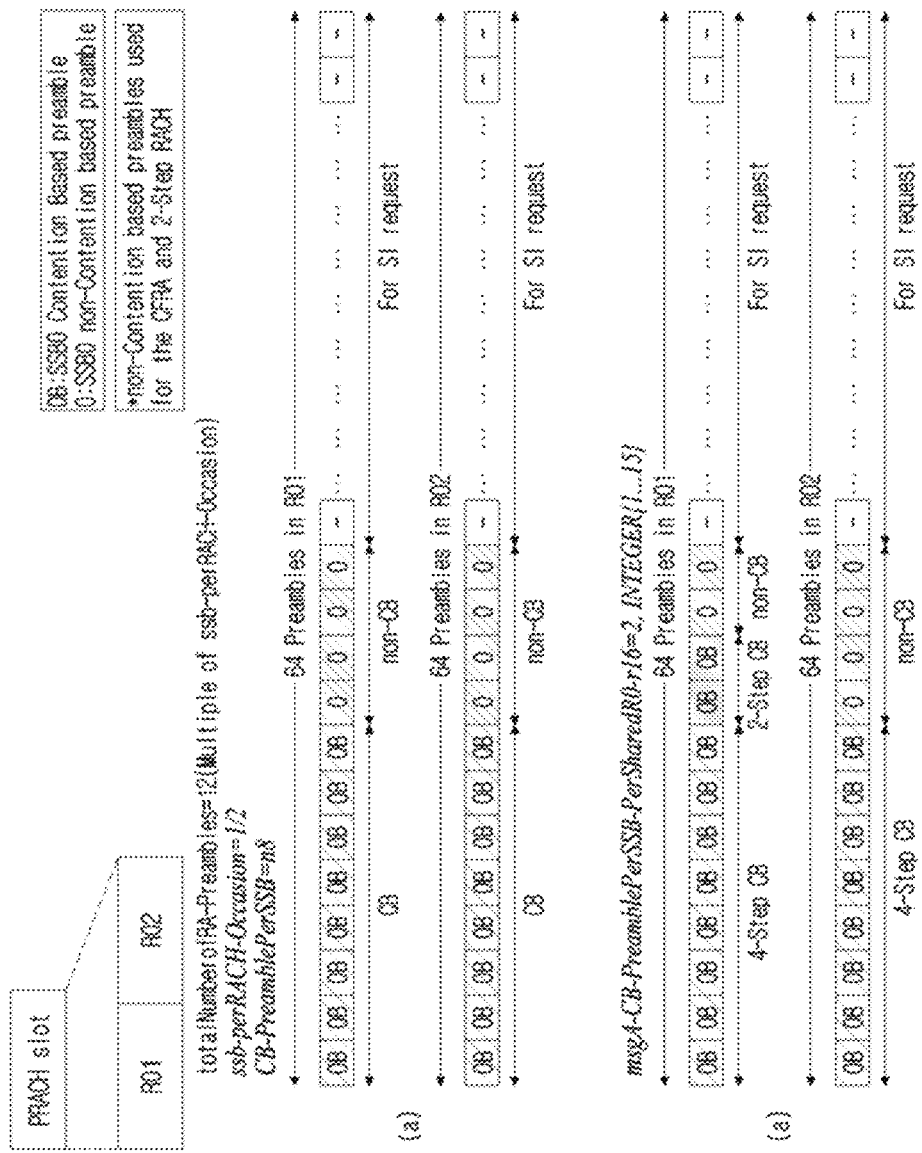
FIG. 10 illustrates an additional example of a 2-step RACH configuration to which the present disclosure may apply.

FIG. 10 illustrates an additional example of a 2-step RACH configuration to which the present disclosure may apply.

An example of FIG. 10(a) represents a case in which a value of totalNumberofRA-Preambles is 12, the number of SSBs for each RO is ½, and the number of CB preambles for each SSB is 8 by a 4-step RACH configuration. Since two ROs (e.g., RO1 and RO2) are associated with the same one SSB, eight preambles among 12 preambles available for RO1 may be configured as CB preambles and the remaining four preambles may be configured as non-CB preambles, and eight preambles among 12 preambles available for RO2 may be configured as CB preambles and the remaining preambles may be configured as non-CB preambles.

An example of FIG. 10(b) represents a case in which a value of the parameter, msgA-CB-PreamblePerSSB-PerSharedRO-r16, is set to 2 and a value of the parameter, msgA-SSB-SharedRO-MaskIndex-r16, is set to 1 or 10 by the 2-step RACH configuration. In this case, RO1 is shared by the 4-step RACH and the 2-step RACH and RO2 is not used for the 2-step RACH. In RO1, two preambles among four preambles configured as non-CB preambles may be configured as CB preambles for the 2-step RACH by the 4-step RACH configuration. Meanwhile, since RO2 is not used for the 2-step RACH, a CB preamble for the 2-step RACH is not configured in RO2.

Table 9 shows an example of MsgA-PUSCH-Config IE.

TABLE 9

```
MsgA-PUSCH-Config information element
-- ASN1START
-- TAG-MSGA-PUSCH-CONFIG-START
MsgA-PUSCH-Config-r16 ::=         SEQUENCE {
   msg A-PUSCH-ResourceList-r16      SEQUENCE (SIZE(1..2)) OF MsgA-
PUSCH-Resource-r16       OPTIONAL, -- Cond InitialBWPConfig
   msgA-TransmformPrecoder-r16        ENUMERATED {enabled, disabled}
OPTIONAL, -- Need S
   msgA-DataScramblingIndex-r16               INTEGER (0..1023)
OPTIONAL, -- Need S
   msgA-DeltaPreamble-r16                     INTEGER (-1..6)
```

TABLE 9-continued

```
OPTIONAL -- Need S
}
MsgA-PUSCH-Resource-r16 ::=        SEQUENCE {
   msgA-PUSCH-PreambleGroup-r16        ENUMERATED {groupA, groupB}
OPTIONAL, -- Need S
   msgA-MCS-r16                    INTEGER (0..15),
   nrofSlotsMsgA-PUSCH-r16         INTEGER (1..4),
   nrofMsgA-PO-PerSlot-r16         ENUMERATED {one, two, three, six},
   msgA-PUSCH-TimeDomainOffset-r16   INTEGER (L..32),
   msgA-PUSCH-TimeDomainAllocation-r16      INTEGER (1..maxNrofUL-
Allocations)           OPTIONAL, -- Need S
   startSymbolAndLengthMsgA-PO-r16            INTEGER (0..127)
OPTIONAL, -- Need S
   mappingTypeMsgA-PUSCH-r16          ENUMERATED {typeA, typeB}
OPTIONAL, -- Need S
   guardPeriodMsgA-PUSCH-r16                        INTEGER (0..3)
OPTIONAL, -- Need R
   guardBandMsgA-PUSCH-r16           INTEGER (0..1),
   frequencyStartMsgA-PUSCH-r16                        INTEGER
(0..maxNrofPhysicalResourceBlocks-1),
   nrofPRBs-PerMsgA-PO-r16           INTEGER (1..32),
   nrofMsgA-PO-FDM-r16               ENUMERATED {one, two, four, eight},
   msgA-IntraSlotFrequencyHopping-r16        ENUMERATED {enabled}
OPTIONAL, -- Need R
   msgA-HoppingBits-r16                       BIT STRING (SIZE(2))
OPTIONAL, -- Need R
   msgA-DMRS-Config-r16              MsgA-DMRS-Config-r16,
   nrofDMRS-Sequences-r16            INTEGER (1..2),
   msgA-Alpha-r16                    ENUMERATED {alpha0, alpha04, alpha05,
alpha06,
                                alpha07, alpha08, alpha09, alpha1}
OPTIONAL, -- Need S
   interlaceIndexFirstPO-MsgA-PUSCH-r16              INTEGER (1..10)
OPTIONAL, -- Need R
   nrofInterlacesPerMsgA-PO-r16                      INTEGER (1.. 10)
OPTIONAL, -- Need R
   ...
}
MsgA-DMRS-Config-r16 ::=          SEQUENCE{
   msg A-DMRS-AdditionalPosition-r16     ENUMERATED {pos0, pos1, pos3}
OPTIONAL, -- Need S
   msgA-MaxLength-r16                    ENUMERATED {len2}
OPTIONAL, -- Need S
   msgA-PUSCH-DMRS-CDM-Group-r16                    INTEGER (0..1)
OPTIONAL, -- Need S
   msg A-PUSCH-NrofPorts-r16                        INTEGER (0..1)
OPTIONAL, -- Need S
   msgA-ScramblingID0-r16                           INTEGER (0..65536)
OPTIONAL, -- Need S
   msgA-ScramblingID1-r16                           INTEGER (0..65536)
OPTIONAL -- Need S
}
-- TAG-MSGA-PUSCH-CONFIG-STOP
-- ASN1STOP
```

In the case of a 2-step random access, MsgA transmission includes a preamble transmission and an uplink message (PUSCH) transmission associated therewith. Table 9 corresponds to an example of an IE that includes parameter for MsgA PUSCH configuration and may include a resource location in a time domain and a frequency domain for a PUSCH resource configuration for each number of groups, the number of PUSCH occasions (POs), a guard band and time, DMRS information, a Modulation and Coding Scheme (MSC), and the like. To associate at least one preamble in a PRACH slot to a PO associated with a DMRS, the UE configures a PUSCH resource according to PUSCH resource configuration information.

The UE induces the number of $N_{preamble}$ to associate the PUSCH within a single PRACH slot. Here, $N_{preamble}$=ceil $(T_{preamble}/T_{PUSCH})$, ceil (x) denotes a maximum integer that does not exceed x, $T_{preamble}$ denotes a total number of preambles in a valid RO within an association pattern period, and $T_{PUSCH}$ denotes a value acquired by multiplying a total number of valid POs within the association pattern period by the number of DMRSs. Therefore, for $N_{preamble}$ preambles within the PRACH slot, numbers are assigned in order of RO-frequency-time. For example, all preambles within a first RO in the time domain and the frequency domain are sequentially numbered and then, if a RO at a different frequency domain location is present at the same time domain location, numbers are assigned to preambles within the corresponding RO. After numbers are assigned to preambles within all the multiplexed ROs in the frequency domain, numbers are assigned to preambles within a RO at a subsequent location in the time domain. Also, consecutive $N_{preamble}$ preambles are associated in order of PO frequency resource ID value ($f_{id}$), a DMRS port resource, a DMRS sequence resource, a time resource ID value ($t_{id}$), and a PUSCH slot ($N_s$) per valid RO within the PRACH slot.

Figure 11:
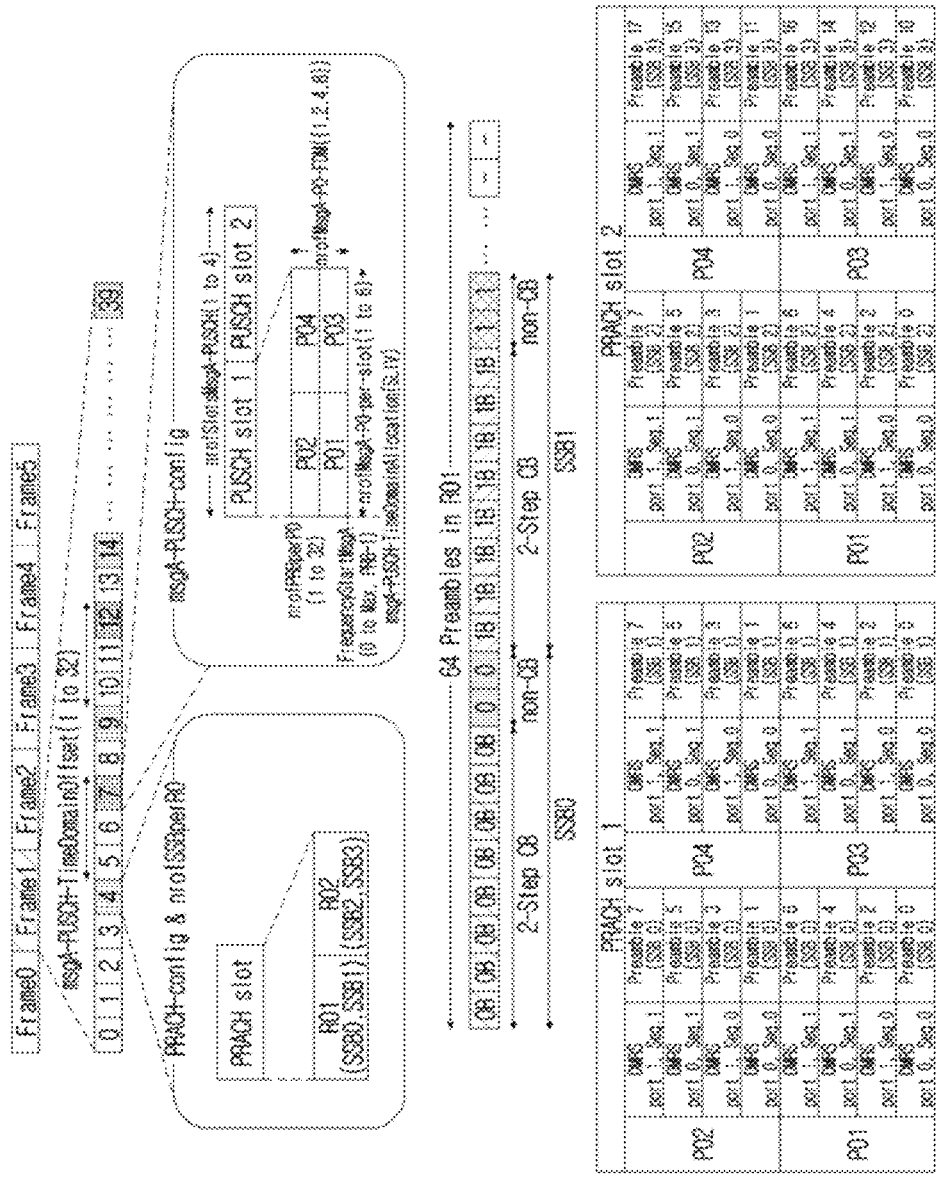
FIG. 11 illustrates an example of mapping of RO and PO to which the present disclosure may apply.

FIG. 11 illustrates an example of mapping of RO and PO to which the present disclosure may apply.

The example of FIG. 11 represents an association relationship between a PRACH preamble and a PUSCH DMRS resource. As described above, a value of $N_{preamble}$ may be induced by calculating the number of preambles to be associated with a PUSCH DMRS resource based on preambles of a valid RO and DMRS resources of a valid PO. In the example of FIG. 11, it is assumed that sufficient PUSCH DMRS resources to be associated with a total number of preambles are configured. For example, it is assumed a case in which two ROs (RO1 and RO2) are configured in a single PRACH slot, two SSBs are associated with a single RO, and eight 2-step RACH CB preambles are configured for each SSB. Also, at least one PO may be configured in a PUSCH slot spaced apart by offset that is set based on a preamble transmission slot. For example, in FIG. 11, PUSCH slot 1 may be set in slot number 7, PUSCH slot 2 may be set in slot number 8, and four POs (PO1, PO2, PO3, and PO4) may be set in each PUSCH slot.

In this case, preambles of the valid RO and DMRS resources of the valid PO may be sequentially associated. For example, Preamble 0 of RO1 is associated with DMRS (port 0, Seq. 0) of PO1 for $f_{id}$=0 and Preamble 1 of RO1 is associated with DMRS (port 0, Seq. 0) of PO2 for $f_{id}$=1. The remaining preambles of RO1 are associated with PUSCH DMRS in ascending order of $f_{id}$, DMRS port, and DMRS seq. and then associated with a PO multiplexed based on a time axis.

Figure 12:
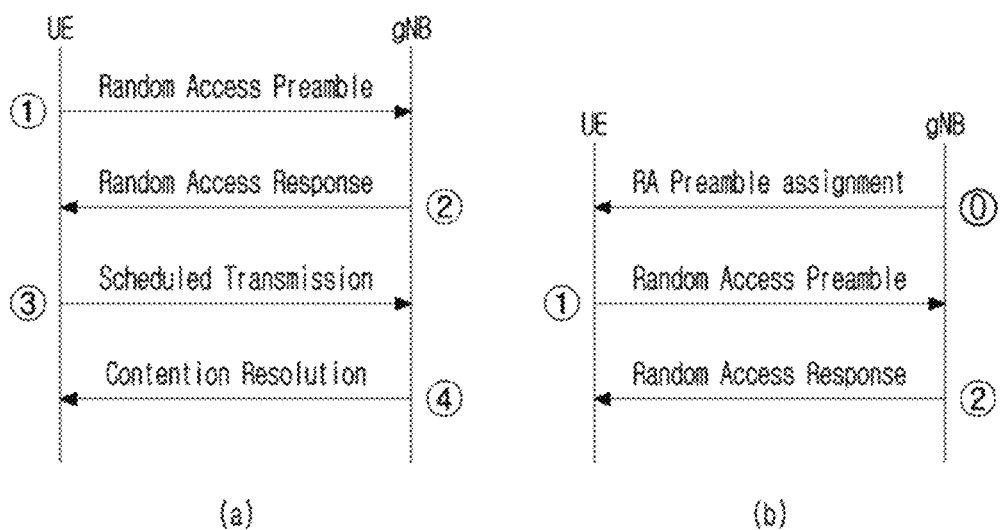
FIGS. 12 to 14 illustrate examples of a random access procedure to which the present disclosure may apply.
Figure 13:
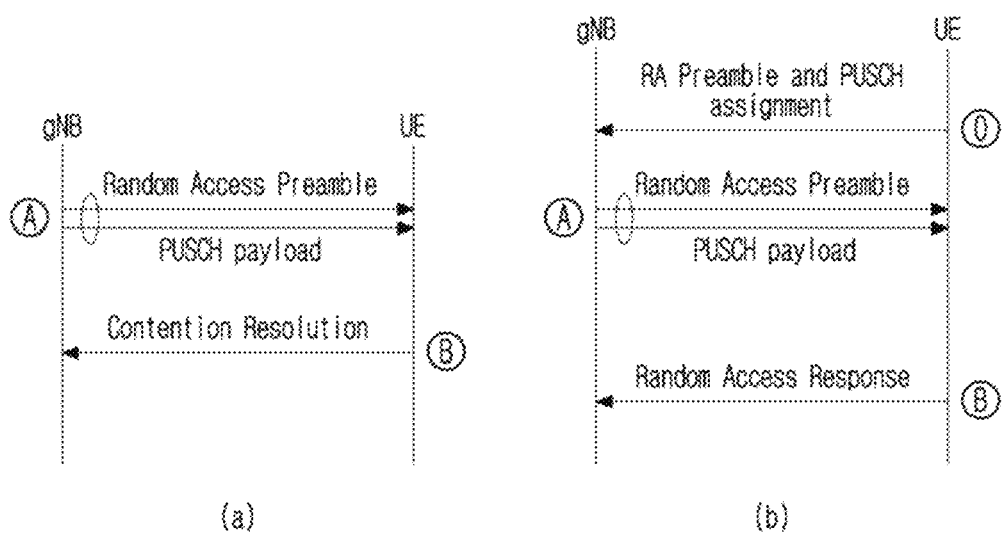
Figure 14:
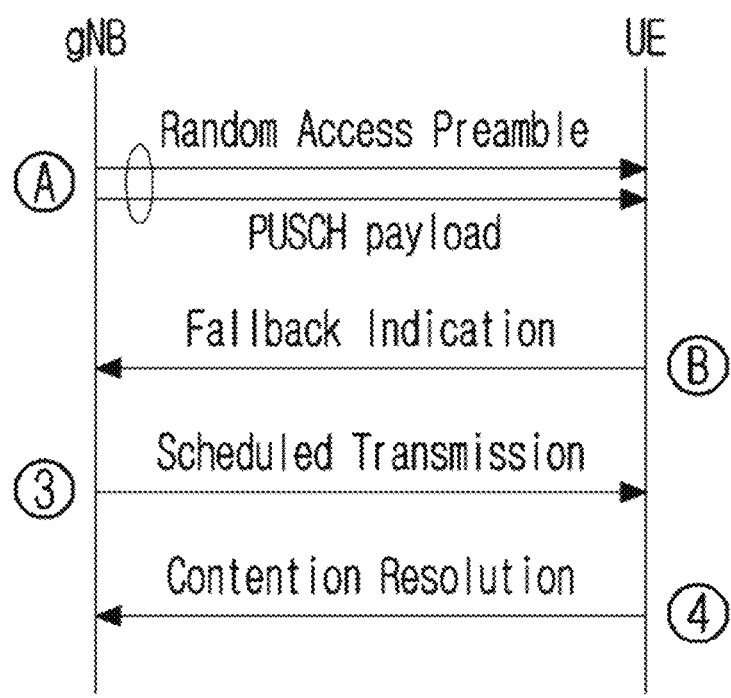

FIGS. 12 to 14 illustrate examples of a random access procedure to which the present disclosure may apply.

FIG. 12(a) represents a CB 4-step random access and FIG. 12(b) represents a CF 4-step random access procedure. FIG. 13(a) represents a CB 2-step random access and FIG. 13(b) represents a CF 2-step random access procedure. FIG. 14 represents a CB random access procedure to which fallback is applied in a 2-step random access type.

A random access may be used when a UE performs an initial access in an RRC idle state, when the UE performs an RRC Connection Re-establishment, when downlink or uplink data occurs in a situation in an uplink synchronization state of the UE is not adjusted, when a PUCCH for scheduling request is not configured, when handover is performed, when the UE is shifted in an RRC inactive state, when system information is requested, or when a beam failure is recovered. Also, a 4-step CB random access that supports an Msg1 preamble transmission, a 2-step CB random access that supports an MsgA preamble and PUSCH transmission, a CF random access that supports an Msg1 transmission, and a CF random access that supports an MsgA may be configured.

When performing a random access, the UE may determine a random access type based on a configuration by a network. For example, when a CF random access resource is not configured, the 4-step or 2-step CB random access may be determined based on an SSB RSRP measurement value. In contrast, when the CF random access resource is configured, the corresponding 4-step or 2-step CF random access procedure may be performed.

The 2-step random access supports a PRACH preamble transmission and an MsgA transmission that includes transmitting a PUSCH payload associated therewith. The UE may transmit Msg A and then may receive MsgB-RNTI-scrambled DCI in a PDCCH within a window size set by a base station. When the UE receives MsgB corresponding to a success random access response (RAR) as a response to the transmission of MsgA, the random access procedure is successfully completed. On the contrary, when the UE receives MsgB corresponding to fallback RARdp, it indicates that the base station has not successfully received payload transmission in the step of MsgA. Therefore, the UE transmits Msg3 with uplink grant resources included in the fallback RAR and monitors a contention resolution message. Here, if the UE does not successfully performs contention resolution, the UE may perform an MsgA retransmission. Here, if the maximum number of MsgA transmissions configured by the base station is reached, the UE may change a type of the random access to the 4-step random access and may perform a CB random access.

In FIGS. 12 and 13, the CB random access represents that the UE randomly selects and transmits one of preambles indicated by SIB1 and the CF random access represents that a preamble to be used by the UE may be allocated by the base station. The UE may transmit Msg1 or MsgA and the base station may include, in a RAR message, and transmit a timing adjustment/advance command (TAC) and an uplink resource configuration (UL grant) for the UE to use for Msg3 transmission based on an arrival point in time of the received preamble. FIG. 14 shows an example of transmitting a fallback RAR when the base station does not successfully receive a payload corresponding to MsgA in the 2-step random access.

Figure 15:
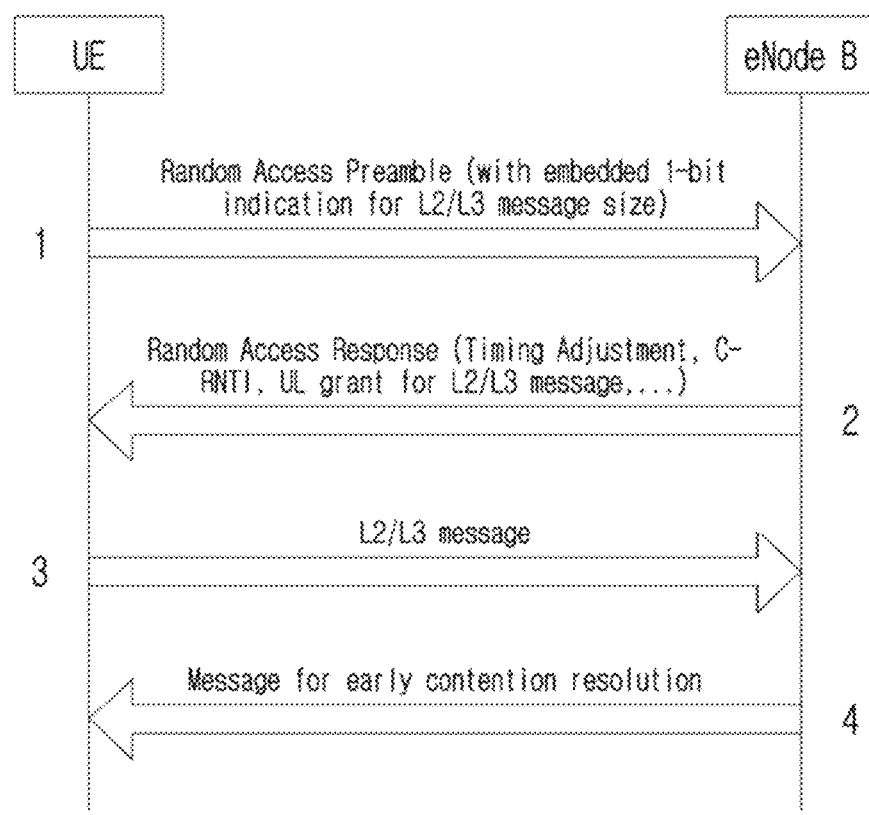
FIG. 15 illustrates an example of an NR random access procedure to which the present disclosure may apply.

FIG. 15 illustrates an example of an NR random access procedure to which the present disclosure may apply.

A CB random access procedure may include a first step in which a UE transmits a random access preamble (or Msg1) to a base station (eNodeB), a second step in which the UE receives a RAR (or Msg2) from the base station, a third step in which the UE transmits a second layer/third layer (L2/L3) message (or Msg3) to the base station, and a fourth step in which the UE receives a contention resolution message (or Msg4) from the base station. Also, the CB random access procedure may include a CB random access procedure additionally using only the second step. The 2-step-based CB random access procedure may include a step A in which the UE transmits a random access preamble and a random access-related message through an uplink channel to the base station and a step B in which the UE receives a random access response and a contention resolution message from the base station.

A CF random access procedure may include only the first step and the second step of the CB random access procedure. Since contention does not occur between UEs, the third step and the fourth step are not required.

This random access procedure may be initiated in response to occurrence of a trigger event and an initialization operation according thereto.

In detail, the random access procedure may be initialized in response to a beam failure indication from PDCCH order, a MAC sublayer, an RRC sublayer, or a PHY layer. A relationship between a detailed cause that triggers a random access in an NR system and an event thereof may be represented as shown in the following Table 10.

TABLE 10

| Event | Initiated by | Note |
|---|---|---|
| Initial access from RRC_IDLE | MAC sublayer | RRCConnectionRequest triggers R-BSR |

TABLE 10-continued

| Event | Initiated by | Note |
|---|---|---|
| RRC Connection Re-establishment | MAC sublayer | RRCConnectionReestablishmentRequest triggers R-BSR |
| Handover | MAC sublayer | RRCConnectionReconfigurationComplete triggers R-BSR |
| DL data arrival | PDCCH order | NW triggers random access |
| UL data arrival | MAC sublayer | New data arrival triggers R-BSR |
| Positioning | PDCCH order | NW triggers random access |
| PSCell management | RRC sublayer | R-BSR triggered by RRCConnectionReconfigurationComplete does not initiate random access in PSCell |
| STAG management | PDCCH order | NW triggers random access in SCell |
| Beam Failure | Beam Failure indication | BF indication from a lower layer |
| On demand SI | MAC sublayer | RRC trigger R-BSR |

A random access procedure in a secondary cell (SCell) excluding a primary secondary cell (PSCell) may be initialized only by PDCCH order and a random access preamble index value may be indicated by PDCCH order. Here, the PSCell represents a primary cee (PCell) in a master cell group (MCG) or a secondary cell group (SCG) in the case of dual connectivity.

Also, through RRC signaling, random access configuration-related information may be provided to UEs. For example, at least one piece of the random access configuration-related information may be provided to the UEs through system information block 1 (SIB1). For example, SIB1 may include an information element (IE), such as ServingCellConfigCommonSIB, ServingCellConfigCommonSIB may include an IE, such as UplinkConfigCommonSIB, UplinkConfigCommonSIB may include an IE, such as initialUplinkBWP (or BWP-UplinkCommon), BWP-UplinkCommon may include an IE, such as RACH-ConfigCommon, and RACH-ConfigCommon may include random access configuration-related information.

In detail, the following information may be provided to the UEs as the random access configuration-related information:

Prach-ConfigIndex: set of available PRACH resources (e.g., PRACH occasions) for transmission of a random access preamble;
ra-PreambleInitialReceivedTargetPower: initial random access preamble power;
rsrp-ThresholdSSB: RSRP threshold value for SSB selection;
csirs-dedicatedRACH-Threshold: RSRP threshold value for CSI-RS selection;
sul-RSRP-Threshold: RSRP threshold value for selection between a normal uplink (NUL) carrier and a supplementary uplink (SUL) carrier;
ra-PreamblePowerRampingStep: power-ramping factor;
ra-PreambleIndex: random access preamble index;
ra-PreambleTx-Max: maximum number of preamble transmissions;
ra-ResponseWindow: size of a time window for monitoring a RAR (indicated to the
UE using the number of slots);
random access preamble set and/or corresponding PRACH resource (if necessary) for system information (SI) request ra-ContentionResolutionTimer: contention resolution timer or window;
bfr-ResponseWindow: size of a window for monitoring a response to a beam failure recovery request;
groupBconfigured: configuration status of random access preamble group B;
numberOfRA-PreamblesGroupA: number of random access preambles that belong to a random access preamble group A. When the preamble group B is configured, the remaining preambles excluding numberOfRA-PreamblesGroupA preambles belong to a group B.

In this regard, a group of preamble indexes and indexes within the group may be sequentially allocated for each SSB (or CSI-RS) depending on whether a mapping relationship between each SSB (or CSI-RS) and a preamble transmission resource and index is preconfigured. The preamble group may be used for the base station to predict a size of UL resources required for Msg3 transmission. That is, if a preamble group B is configured in the UE, if a size of Msg3 to be transmitted by the UE is greater than a predetermined Msg3 threshold size (e.g., a value determined based on the parameter, ra-Msg3SizeGroupA, if a size of UL data information that includes a MAC header and MAC CEs) and if a pathloss value thereof is less than "PCMAX of a serving cell-preambleReceivedTargetPower-msg3-DeltaPreamble-messagePowerOffsetGroupB" that performs a random access, the UE may select a preamble index within the group B and may transmit a preamble. When it is verified that a preamble that belongs to the group B is received, the base station may perform scheduling for the UE by including size information of UL resources required for Msg3 transmission within Msg2 that is response information on a corresponding preamble. That is, 1-bit indication for a size of Msg3 (i.e., L2/L3 message) may be embedded in a random access preamble transmission. Otherwise, (i.e., if the size of Msg3 to be transmitted by the UE is less than or equal to the predetermined Msg3 threshold size or if the pathloss value is greater than or equal to "PCMAX of the serving cell-preambleReceivedTargetPower-msg3-DeltaPreamble-messagePowerOffsetGroupB"), the UE may select a preamble index within the group A and may perform a preamble transmission. The base station may expect a potential preamble reception in all preamble indexes configured in a preamble group within configured RACH occasions and may perform an associated preamble reception.

When initializing the random access procedure, the UE may empty an Msg3 buffer, may set a preamble transmission counter to 1, may set a preamble power ramping counter to 1, and may set a preamble backoff to 0 ms. If a carrier in which a subsequent random access procedure is performed is explicitly signaled, the UE may perform the random access procedure in the corresponding carrier. Otherwise, that is, if a SUL is configured in a cell for the random access procedure and if an RSRP value of a downlink pathloss of the corresponding cell is less than a value of rsrp-ThresholdSSB-SUL, the SUL may be selected as a carrier for performing the random access procedure and a $P_{CMAX}$ (maximum UE transmission power) value for the SUL may also be set. Otherwise, an NUL carrier may be selected as a carrier for performing the random access procedure and a $P_{CMAX}$ value for the NUL carrier may be set.

Then, the UE may set a preamble index value through a resource selection procedure and may determine a related subsequent available PRACH occasion. In detail, the PRACH occasion is determined depending on a case in which an association configuration for a block index of SSB and a PRACH occasion is present, or a case in which an association configuration for CSI-RS or a PRACH occasion is present, or a case in which the association configurations are not provided to the UE. If the association configuration with the SSB or the CSI-RS and the PRACH occasion is present, the PRACH occasion associated therewith may be determined according to the SSB or the CSI-RS selected by the UE. If the association configuration with the SSB or the CSI-RS and the PRACH occasion is absent, the UE may perform a preamble transmission in a subsequent available PRACH occasion.

Then, the UE may perform a preamble transmission based on the selected PRACH occasion. In detail, the MAC may provide a selected preamble, an associated Radio Network Temporary Identifier (RNTI), a preamble index, and Rx target power to the PHY and may indicate to perform transmission of the selected preamble transmission.

After transmitting the preamble, the UE needs to monitor Msg2 (or RAR) reception corresponding thereto. A time (window) section for this may be defined by ra-ResponseWindow. After a predetermined number of symbols after transmitting the preamble, the UE may expect RAR reception and may perform PDCCH/PDSCH monitoring for Msg2 during a period of time corresponding to the window section.

In more detail, RAR information may be transmitted from the base station in a format of MAC PDU through a PDSCH. To receive the PDSCH, the UE may monitor a PDCCH based on a RA-RNTI value. That is, the PDCCH may include information of a UE that needs to receive the PDSCH, information of a PDSCH transmission resource, a transmission format of the PDSCH, and the like. The RAR may include a random access preamble identifier (RAPID), an uplink (UL) grant indicating an Msg3 transmission resource, a temporary cell (C)-RNTI, a timing adjustment/advance command (TAC), and the like.

When response information (e.g., RAPID) is included in Msg2 received by the UE, it is considered as a successful RAR reception. Otherwise, the aforementioned preamble resource selection may be performed again to prepare a preamble retransmission.

Based on parameter information for Msg3 transmission, such as UL grant information within the received Msg2, the UE may perform Msg3 transmission. Once the Msg3 transmission is performed, the UE may initiate a contention resolution timer (CR timer) and may perform PDCCH monitoring based on a C-RNTI for Msg4 reception. If Msg4 is received while the CR timer is running, the UE may determine that a contention resolution is successfully implemented.

Hereinafter, an RC NR to which the present disclosure may apply is described.

In 3GPP, it is verified that IMT-2020 requirements may be certified for mMTC purpose through NB-IoT or LTE-M. For URLLC support, all URLLC functions are introduced in Rel-15 LTE/NR. NR URLLC is still evolving through Rel-16 eURLLC and industrial IoT (IIoT) work items. Also, in Rel-16, 5G integration work for application of Time-Sensitive Networking (TSN) and Time Sensitive Communication (TSC) is being performed.

A 5G wireless communication system includes supporting the connected industry. This 5G connectivity may become a basis for the next driving of the industry and digitalization. In this industrial environment, a large number of UEs based on the 5G connectivity may be interconnected and such a massive industrial wireless network supports not only URLLC services having high requirements but also a UE having relatively low performance and provides a fully operational battery life for many years. The requirements for the services are actually higher than that of LPWA such as NB-IoT or LTE-M, but lower than that of eMBB or URLLC.

Similar to the aforementioned connected industry, the 5G connectivity may be used as a basis for a next generation smart city innovation. For example, in a smart city use case, the 5G connectivity may be effectively used to collect data in cities and to use and monitor city resources. In particular, installation of surveillance cameras may be used for an important/essential role not only in cities but also in factory areas. Also, a wearable device, for example, a smart watch and a health-related device, may be considered as a single use case having a small size.

Therefore, considering the aforementioned scenario and use case, as the requirements in a technical point of view, relatively low UE cost and complexity are required for UE connectivity compared to an eMBB or URLLC UE of Rel-15 or Rel-16, a UE size is required to have a compact form factor, and an installation environment may consider FR1 and FR2 for FDD and TDD.

For an industrial wireless sensor, it may be considered that communication service availability is 99.99%, end-to-end latency is less than 100 ms, a reference bit rate for all use cases is less than 2 Mbps (e.g., considering a potentially asymmetric case such as uplink traffic compared to downlink), the UE is assumed to be stationary, a battery needs to be maintained for at least several years, and, in the case of a security-related sensor, it may be considered that latency requirements is less than 5-10 ms.

In the case of video surveillance, an economical video bitrate of 2-4 Mbps, latency of less than 500 ms and reliability of 99%-99.9% may be considered as a reference. In the case of a high-end video, a bitrate of 7.5-25 Mbps may be considered and a traffic pattern in which an uplink transmission is dominant compared to downlink may be considered. For example, a video camera device, such as a CCTV, refers to a device of medium to high capability that is difficult to support with the conventional LPWA technology such as conventional NB-IoT and eMTC. In particular, the CCTV has a high growth rate as a single model that constitutes a smart city and many companies are participating in related manufacturing and pay great attention in connectivity between such devices.

In the case of wearable, reference bitrates of 10-50 Mbps in downlink and minimum 5 Mbps in uplink and peak bitrates of 150 Mbps in downlink and 50 Mbps in uplink may be considered for smart wearable application.

As described above, for an RC UE or an RC NR, new IoT technology that may not be supported by the conventional eMTC (or LTE-M) or NB-IoT is required. In detail, a relatively low latency and a relatively high bitrate and reliability are required compared to those of the eMTC or NB-IoT UE. Compared to those of the eMBB UE, relatively low price and complexity and a relatively long battery use time are required. Compared to the URLLC UE, there is a need to support relatively wide coverage.

Hereinafter, examples of the present disclosure related to a random access procedure in an RC NR system are described.

High-end or high-performance UEs (hereinafter, a first type UE or an existing NR UE) having high-end UE capability for the purpose of the existing eMBB and URLLC service have been present in an NR network. In contrast, introduction of a low-medium UE (hereinafter, a second type UE or an RC UE) having reduced capability (RC) is being considered to support new IoT, wearable, and various vertical services. Since the RC UE has lower complexity, capability, and hardware characteristics dissimilar to the existing high-performance NR UE in the NR network, the performance degradation thereof is predicted in terms of transmission and reception reliability, a data transmission rate, coverage, and the like. In particular, in terms of a coverage reduction, additional compensation for the RC UE needs to be provided. Here, although performance aspects (e.g., a data transmission rate, reliability, and low complexity, etc.) other than the coverage reduction are intended by the RC UE, it is expected that, if the coverage reduction of even the RC UE is significant compared to that of the existing NR UE in terms of the coverage reduction, it may greatly affect the competitiveness (e.g., marketability and usability) of the RC UE.

Therefore, the present disclosure includes a specific method for compensating for a coverage reduction between the RC UE and the NR network. In particular, the present disclosure includes a coverage compensation method for transmitting and receiving a message initially transmitted by the UE in a random access procedure (e.g., a preamble or Msg1 in the 4-step random access procedure or MsgA in the 2-step random access procedure).

When low-performance RC UEs are additionally introduced to the existing NR UEs, UEs having various capabilities may be mixed in the NR network. That is, since UEs within a single cell are present with different channel environments and capabilities, the base station (e.g., gNB) needs to quickly identify capabilities of corresponding UEs from an initial cell access stage. Basically, since the base station configures the existing cell coverage based on the existing NR UE having high-end performance, it is necessary to provide an uplink/downlink transmission in a differentiated manner due to the introduction of the low-performance RC UEs.

For example, if the base station is capable of knowing a coverage level of the RC UE in advance during a random access process, a variety of resource utilization for transmission and reception between the base station and the UE present in the random access process may be optimized. Here, the coverage level may correspond to a preamble or the number of MsgA repetition transmissions. That is, the coverage reduction may be compensated for by repeatedly transmitting the random access preamble or MsgA. Therefore, the coverage level may correspond to the number of repetition transmissions (or repetition level). For example, it is possible to distinguish the RC UE and the existing NR UE in advance during the random access process, it is possible to ensure the reception reliability and coverage of the RC UE as well as optimization for resource utilization for transmission and reception between the base station and the UE after the random access process.

Example 1

A resource selection method for an MsgA repetition transmission for an RC UE that performs a random access procedure is described.

As described above, if an event of triggering a random access (RA) procedure occurs, an appropriate RA procedure corresponding to the event needs to be performed. A first operation that the UE needs to perform within the RA procedure is to transmit a preamble (i.e., PRACH in a 4-step RA) or MsgA (i.e., PRACH and PUSCH in a 2-step RA) through uplink. The RC UE corresponds to a low-performance UE that has low complexity, low cost, low performance, low support bandwidth, a small number of antennas, and the like, which differs from the existing NR UE. A new operation needs to be defined to support the same. To this end, herein proposed is a new resource selection method required for the RC UE that performs the 4-step RA or the 2-step RA to perform a preamble repetition transmission or an MsgA repetition transmission.

Each of UEs may select an optimal SSB index suitable for its own channel environment, for example, an SSB having the highest SSB-RSRP (or optimal CSI-RS, for example, CSI-RS having the highest CSI-RS-RSRP) based on an SSB transmitted from the base station (or CSI-RS if configured in an RRC CONNECTED mode. Here, RC UEs may need to perform longer SSB (or CSI-RS) monitoring or measurement, which differs from the existing NR UE. This is because the RC UE may verify corresponding information by receiving an SSB (or CSI-RS) for a longer period of time compared to the existing NR UE even in a situation in which a reception level or reception coverage of the SSB (or CSI-RS) is the same due to the reduced capability or the reduced complexity (e.g., a limitation, such as the number of Tx/Rx antennas limited to 1, a reduced bandwidth, a low transmission power class, or an application of limited half duplex). The RC UE may perform a random access procedure that includes a random access preamble or an MsgA transmission using random access configuration-related information that is provided through a selected SSB index (or, CSI-RS index) and SIB1 (or dedicated RRC signaling).

Here, due to a reduced performance characteristic of the RC UE, a significant coverage reduction and reception reliability reduction may occur in the RC UE compared to the existing NR UE. Therefore, one of technologies to solve this issue is a method of repeatedly transmitting a PHY channel and/or signal. This repetition transmission method may be considered for coverage expansion. Even in a wireless communication system of a previous generation, the effect has been sufficiently proved. Therefore, the present disclosure describes detailed operations that need to be newly defined to support a repetition transmission of MsgA or the initial preamble by focusing on the random access procedure of the RC UE.

For clarity of description, the following description is made by mainly using, as an example, MsgA of a 2-step random access procedure that includes all of a preamble (or PRACH) transmission and a PUSCH transmission. However, the scope of the present disclosure is not limited thereto. Examples for the preamble (or PRACH) repetition transmission of the present disclosure may apply alike even to a preamble (or Msg1 or PRACH) transmission of a 4-step random access procedure.

In the following examples, a repetition transmission of a preamble and a repetition transmission of a PUSCH associated with the preamble are considered within a single MsgA repetition transmission attempt (here, a single MsgA repetition transmission attempt including at least one MsgA repetition transmission). Although the MsgA repetition transmission attempt may be performed at least once within a maximum number of attempts, the MsgA repetition transmission in the examples of the present disclosure represents the repetition transmission of MsgA within a single attempt (or each of a plurality of attempts). That is, MsgA may be repeatedly transmitted in a first attempt and MsgA may be repeatedly transmitted in a second attempt.

In terms of the MsgA repetition transmission of the RC UE, a method of selecting a resource for PRACH (or preamble) repetition transmission included in MsgA and PUSCH repetition transmission associated therewith needs to be defined.

The existing NR UE randomly selects a single RO from among ROs associated with the selected SSB with the same probability. On the other hand, since the RC UE needs to perform a PRACH repetition transmission, a RO selection method different from that of the existing NR UE needs to be considered. For example, the base station may configure a start RO offset for the RC UE through upper layer signaling and when a single RO is present in a frequency domain at a time location indicated by the start RO offset based on a time domain RO index among ROs associated with the selected SSB, the RC UE may select a corresponding RO as a start RO. Alternatively, when at least two ROs are configured in the frequency domain at the indicated time location, the RC UE may randomly select one of the at least two ROs as a start RO. Alternatively, the base station may set one of the at least two ROs in the frequency domain as the start RO. In this manner, a random selection of the UE may not be required.

As described above, when the RC UE selects a start RO for PRACH repetition transmission, the RC UE may perform a repetition transmission according to a determined PRACH repetition level value. A repetition transmission method may include the repetition transmission in the time domain (i.e., transmission in a plurality of time division multiplexed (TDM) ROs time division), the repetition transmission in the frequency domain (i.e., transmission in a plurality of frequency division multiplexed (FDM) ROs at the same time domain location), the repetition transmission in the time and frequency domains (i.e., transmission in the plurality of TDM and FDM ROs).

Here, a repetition level of the RC UE may be determined by the UE itself and may be explicitly indicated by the base station. For example, the repetition level may be selected or determined by the UE based on a threshold value for a channel measurement value of the UE (pathloss, RSRP, Reference Signal Received Quality (RSRQ), etc.), UE capability, and the like. Alternatively, when the base station is aware of channel measurement information of the UE in an RRC connected state, the base station may configure a repetition level of the corresponding UE through dedicated RRC signaling. Also, a RO group corresponding to the repetition level, a preamble group, or a combination of the RO group and the preamble group may be configured according to a predetermined rule or signaling of the base station.

Example 2

A MsgA repetition transmission procedure is described.

A start RO and a PO selection method associated therewith need to be considered such that the RC UE may perform repetition transmissions corresponding to various repetition levels.

Initially, for the RC UE, a configuration related to at least one repetition level for PRACH and/or PUSCH repetition transmission within at least random access procedure may be provided for the RC UE. For the PRACH and/or PUSCH repetition transmission, a configuration for RO and/or preamble (i.e., preamble group and index) may be provided and a PO associated therewith, a PUSCH resource configuration (e.g., PUSCH DMRS resource (port and/or sequence) index), and the like may be provided. Collectively, this may be referred to as an MsgA repetition transmission configuration for the RC UE. In this case, a separate MsgA repetition transmission configuration may be provided for each repetition level. Alternatively, within the same single MsgA repetition transmission configuration, an MsgA repetition transmission configuration corresponding to each repetition level may also be provided.

The following examples relate to a resource selection method for a random access procedure with the assumption that the aforementioned MsgA repetition transmission configuration is provided.

Also, although the following description is made mainly based on an example in which a reference for selecting a repetition transmission resource is an optimal SSB index selected by the UE, the following examples may also apply alike even to a case of selecting a repetition transmission resource based on a CSI-RS index.

Also, a separate PRACH configuration (or MsgA configuration) may be provided to each of the RC UE and the existing NR UE.

Figure 16:
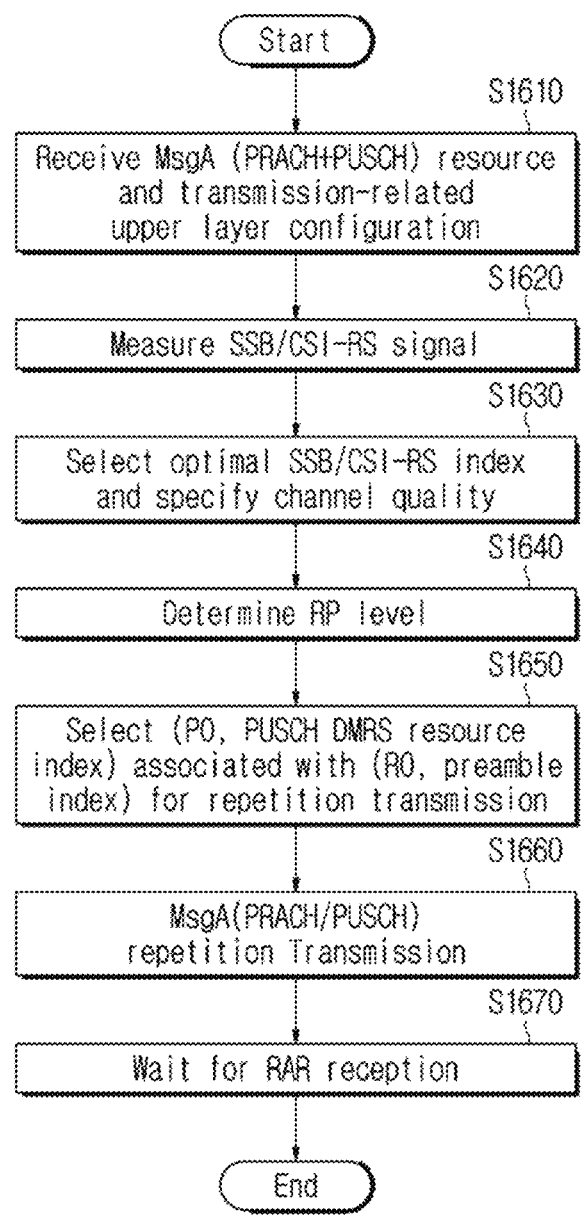
FIG. 16 is a flowchart illustrating an MsgA repetition transmission method to which the present disclosure may apply.

FIG. 16 is a flowchart illustrating an MsgA repetition transmission method to which the present disclosure may apply.

An example of FIG. 16 corresponds to an operation in which the RC UE repeatedly transmits MsgA within a single MsgA repetition transmission attempt.

In operation S1610, a base station may provide an RC UE with upper layer parameters for various random access procedures that include the aforementioned MsgA repetition transmission configuration through SIB1 or dedicated RRC signaling. For example, a PRACH configuration, a RO configuration, a preamble (group and/or index) configuration, an MsgA time and/or frequency configuration, an SSB-to-RO mapping configuration, a PUSCH configuration associated with a PRACH transmission, a PO configuration, a PUSCH DMRS resource (port and/or sequence) configuration, a repetition level configuration, an SSB/CSI-RS measurement-related configuration, and the like may be provided to the RC UE.

In operation S1620, the UE may measure an SSB/CSI-RS signal associated with a beam transmission optimal for the corresponding UE through an SSB/CSI-RS transmitted in downlink. Here, channel measurement values corresponding to pathloss, an RSRP value, and the like may be measured by the UE based on an SSB/CSI-RS signal.

In operation S1630, the UE may select an SSB/CSI-RS index having a best RSRP value and may specify the channel quality.

In operation S1640, the UE may determine a repetition level (RP level) based on a channel measurement value and a threshold value related thereto (e.g., an SSB/CSI-RS RSRP threshold value for selecting a repetition level), UE capability, and the like. Alternatively, when the UE is additionally in an RRC connected state and when the base station is capable of using channel measurement information of the corresponding UE, the base station may configure a repetition level for the corresponding UE through dedicated RRC signaling. In this case, the UE may determine the repetition level according to configuration of the base station.

In operation S1650, the UE may determine the number of repetition transmissions based on the determined repetition level and may select a RO and/or a preamble (i.e., preamble group and index) corresponding to the number of repetition transmissions, and a PO and/or a PUSCH resource configuration (e.g., DMRS resource (port and/or sequence) index) associated therewith.

In operation S1660, the UE may perform an MsgA repetition transmission based on the selected resource.

In operation S1670, the UE may wait for a response to MsgA during a predetermined window (e.g., RAR or contention resolution message).

Table 11 shows an example of a PRACH configuration table.

RO mask configuration information may be provided and this may indicate a RO allowed for an actual PRACH transmission among eight ROs associated with a single SSB. In the illustrated example, RO mask configuration in which all of eight ROs associated with a single SSB are allowed to be used for PRACH transmission.

Also, a time offset value about a selectable start RO may be provided to the RC UE based on the number of PRACH repetition transmissions of the RC UE among all the ROs present within a single association period. In the following example of FIG. 22, the RC UE may randomly select a single RO among ROs at a time domain location indicated by a start RO offset parameter (e.g., 3) from among the eight ROs associated with a single SSB (e.g., SSB1) (, in the illustrated example, randomly select a single RO from among of FDM two ROs at a fourth time domain RO location). The UE may perform a PRACH repetition transmission using the selected time RO and subsequent time domain RO indexes. Unlike this, the existing NR UE may randomly select only a single RO from among the eight ROs associated with a single SSB and may perform a PRACH transmission.

TABLE 11

| PRACH Config. Index | Preamble format | n_SFN mod x = y | | Subframe number | Starting symbol | Number of PRACH slots within a subframe | N_t^RA, slot, number of time-domain PRACH occasions within a PRACH slot | N_dur^RA, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |

The PRACH configuration of Table 11 provides a time domain RO provided to UEs within a cell according to a PRACH configuration index, a PRACH slot, a start symbol, a subframe (slot), a (wireless) frame source, and preamble format information based on a frequency range (FR) and a paired spectrum status. A RO associated for each SSB/CSI-RS index within the actual number of SSB/CSI-RS transmissions (, which is configured by an upper layer) may be determined based on PRACH configuration information and a correlation relationship between an SSB/CSI-RS and a RO.

Figure 19:
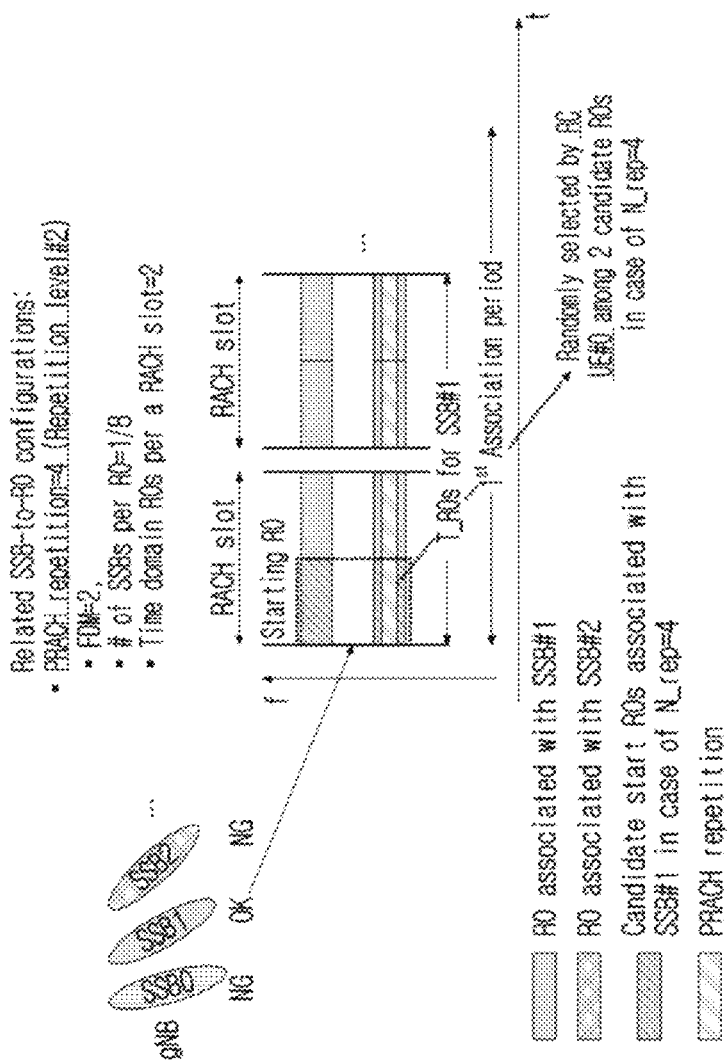
FIGS. 19 to 25 illustrate examples of a start RO selection method to which the present disclosure may apply.
Figure 22:
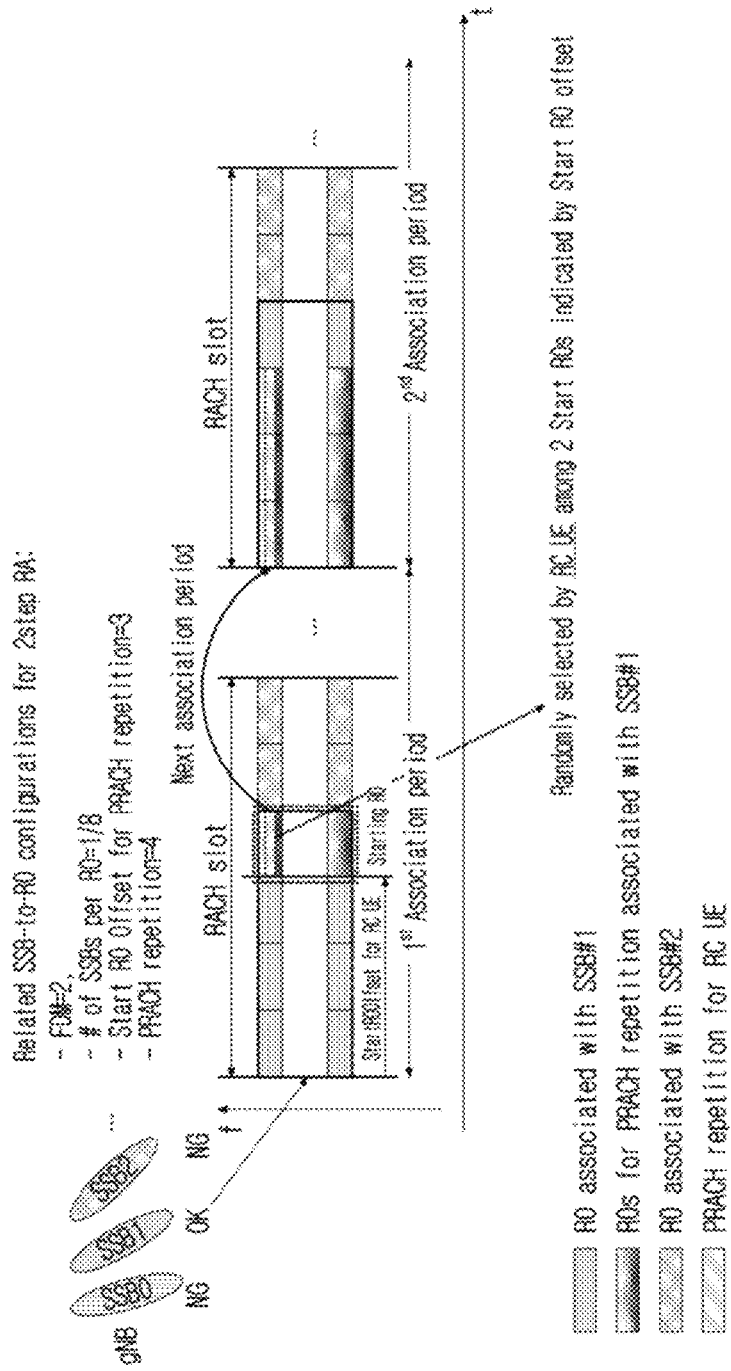

For example, referring to the following example of FIG. 19, two ROs are present in the frequency domain (i.e., FDM=2) and ROs associated for each SSB among ROs configured according to the PRACH configuration are mapped in the time domain. For example, SSB1 corresponding to the optimal SSB selected by the UE are associated with eight ROs. In the illustrated example, SSB2 are associated with a total of eight ROs including four ROs and subsequent four ROs within a next RACH slot. Additionally, A start RO offset for PRACH repetition may be applied based on a quickest RO in the time domain among ROs associated with an SSB selected by the UE (i.e., a lowest RO index among the ROs associated with a single SSB). Therefore, a PRACH repetition transmission may be initiated from a RO separated by a start RO offset value in the time domain. In the example of FIG. 22, if a value of the start RO offset is 3, eight ROs from a fourth time domain spaced apart by three time domain ROs from a first time domain RO that is a time domain RO of a lowest index may be used for the PRACH repetition transmission of the RC UE. This start RO offset value may be applied based on the first (or lowest indexed) time domain RO among ROs associated with an SSB every association period or association pattern period, or may be applied based on SFN #0.

Example 3

Selection of a repetition level is described.

A repetition level of the RC UE may be mapped to the number of repetition transmissions. Table 12 shows an example of a mapping relationship between the repetition level and the number of repetition transmissions.

TABLE 12

| Repetition level index | The number of repetitions for PRACH | The number of repetitions for PUSCH |
|---|---|---|
| RP level 0 | 1 | 1 |
| RP level 1 | 2 | 2 |
| RP level 2 | 4 | 4 |
| RP level 3 | 8 | 8 |
| ... | ... | ... |

In the example of Table 12, if repetition level index=0, it represents a configuration in which the number of PRACH repetition transmissions is 1 and the number of PUSCH repetition transmissions is 1. For the respective cases in which repetition level index=1, 2, and 3, the number of PRACH repetition transmissions may be configured as 2, 4, and 8 and the number of PUSCH repetition transmissions may be configured as 2, 4, and 8. However, it is provided as an example only. The repetition level index and the number of repetition transmissions may be configured using different values. Also, the number of PRACH repetition transmissions and the number of PUSCH repetition transmissions that are mapped to a single repetition level index may be configured using different values. Also, the number of PRACH repetition transmissions that is mapped to the repetition level index and the number of PUSCH repetition transmissions that is mapped to the repetition level index may be separately configured.

The base station may indicate, to the RC UE, the number of PRACH repetition transmissions and/or the number of PUSCH repetition transmissions that are mapped to the repetition level through SIB1 or dedicated RRC signaling. The mapping relationship between the repetition level and the number of PRACH repetition transmissions and/or the number of PUSCH repetition transmissions shown in the example of Table 12 may be configured through upper layer signaling or may be given in advance to the base station and the UE.

For example, the base station may provide the UE with a range of repetition levels allowed for the RC UE through upper layer signaling, the number of available PRACH and/or PUSCH repetition transmissions for each repetition level, a threshold value and related configuration for determining a repetition level through SIB1 or dedicated RRC signaling before the random access procedure. Alternatively, the UE and the base station may also perform the random access procedure according to a predetermined repetition level and PRACH and/or number of PUSCH repetition transmissions through separate signaling.

Figure 17:
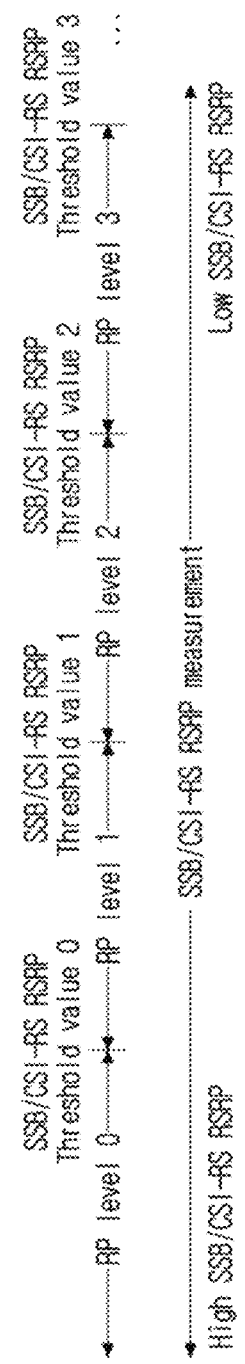
FIGS. 17 and 18 illustrate examples of selecting a repetition level to which the present disclosure may apply.

FIG. 17 illustrates an example of selecting a repetition level to which the present disclosure may apply.

At least one SSB/CSI-RS RSRP threshold value may be configured by the base station. The UE may measure an SSB/CSI-RS RSRP value, may compare the same to a set threshold value, and may determine a repetition level. Referring to the example of FIG. 17, the lower the repetition level, the better a channel environment (e.g., high SSB/CSI-RS RSRP). Also, a smaller number of PRACH and/or PUSCH repetition transmissions may be configured and applied.

As an additional example, an offset (e.g., RSRP offset) value for a threshold value may be applied according to UE capability. For example, for a UE having a first UE capability, the RSRP offset may be set to a value of 0 and the set SSB/CSI-RS RSRP threshold value may be used as is. For a UE having a second UE capability, the RSRP offset may be set to a value aside from 0 and a threshold value to be finally applied may be determined from the set SSB/CSI-RS threshold value+RSRP offset value. As described above, the base station may set and provide a distinguished RSRP offset value according to UE capability and the UE may determine a threshold value to be applied for determining a repetition level by applying an RSRP offset value corresponding to its own capability to the set threshold value.

As an additional example, to determine a repetition level according to a UE capability, a selectable repetition level of the UE may be differently set for each UE capability. For example, a UE having a first UE capability may select a repetition level from a repetition level index set including 0, 1, 2, and 3 and a UE having a second UE capability may select a repletion level from a repetition level index set including 2 and 3. As described above, by limiting a supportable repetition level according to the UE capability, a UE capability considered repetition level may be selected and applied in addition to selecting a repetition level based on an RSRP measurement value and a threshold value.

Figure 18:
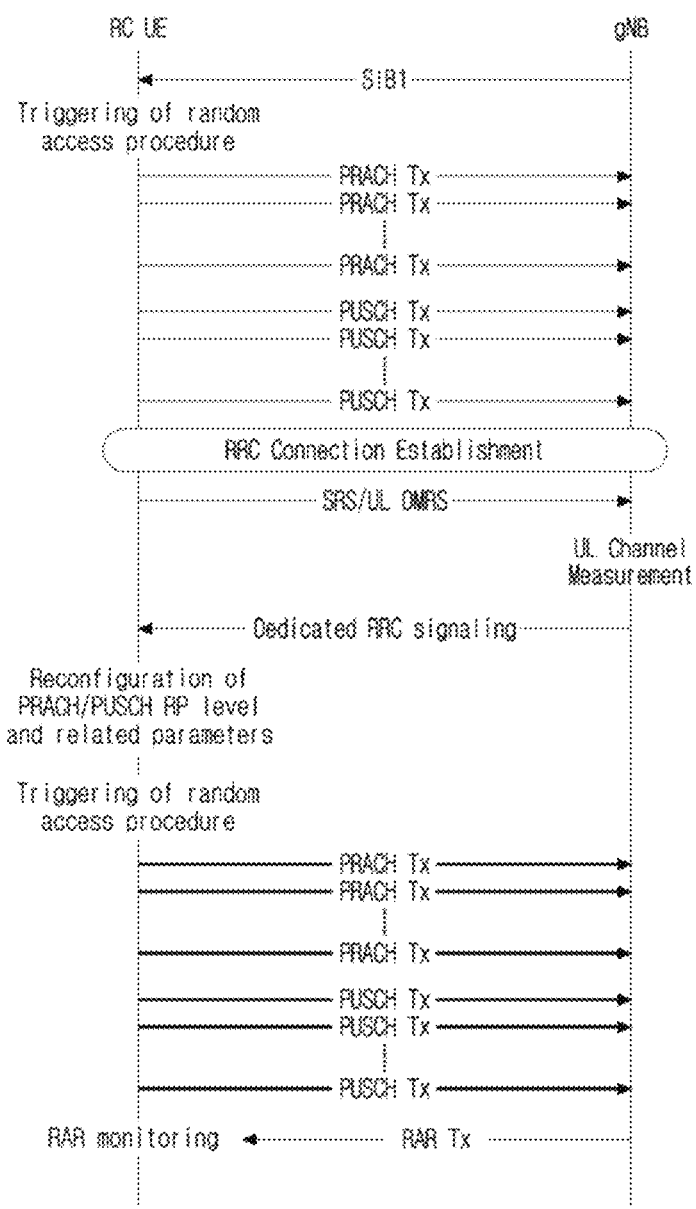

FIG. 18 illustrates an additional example of selecting a repetition level to which the present disclosure may apply.

A repetition level related to a PRACH and/or PUSCH repetition transmission may be set or reset to the UE in such a manner that the base station measures an uplink RSRP value using a sounding reference signal (SRS) transmitted by the UE, an UL DMRS, a PRACH, and the like and determines the repetition level based on a threshold value related thereto.

Referring to the example of FIG. 18, a repetition level determination method by the base station may be applied when the RC UE is in an RRC connected mode. For example, the RC UE may receive a random access-related configuration from the base station through SIB1 and when the random access procedure is triggered, may perform a PRACH repetition transmission and a PUSCH repetition transmission with respect to the base station. When the random access procedure is successfully completed, the UE may establish an RRC connection. In the RRC connected mode, the UE may transmit an SRS and/or a UL DMRS to the base station. As described above, the base station may measure uplink channel quality (e.g., SRS-RSRP, DMRS-RSRP, etc.) based on various uplink channels and/or signals (e.g., SRS, PUSCH DMRS, PUCCH DMRS, PRACH, etc.) received from the UE. This uplink channel measurement result may be compared to a threshold value predetermined or internally set by the base station and the base station may determine a repetition level of the RC UE.

The repetition level of the RC UE determined by the base station may be set or reset to a corresponding UE of the determined RC UE through dedicated RRC signaling. Next, when the random access procedure is triggered in the RC UE, the UE may perform a PRACH repetition transmission and/or a PUSCH repetition transmission based on the repetition level set/reset by the base station.

As described above, a method of determining, by the base station, a repetition level of a UE based on uplink signal/channel measurement may set a more optimal repetition level to the UE compared to a method of determining, by the UE, a repetition level based on downlink signal/channel measurement. Therefore, since the efficiency of determining the number of repetition transmissions required for the random access procedure and using resources required for the same increases, a random access procedure success probability may increase, a latency may decrease, system capacity for data transmission and reception of other UEs within a cell may increase, and interference may be minimized.

As an additional example, if a UE operating in the RRC connected mode is shifted to an RRC idle or inactive mode after receiving repetition level configuration information from the base station, the UE may perform the random access procedure based on the repetition level configuration information instead of using configuration information that is provided through SIB1. Here, a time section (e.g., timer) in which the UE maintains repetition level configuration information may be defined and used. After the time section (or after expiry of the timer), the UE may perform the random access procedure based on configuration information that is provided through SIB1.

Also, a separate PRACH configuration and PUSCH configuration may be provided for each repetition level. In this case, the base station may perform separate RO and/or PO configuration for each repetition level. Therefore, the base station may identify a repetition level of the UE that transmits corresponding MsgA based on a PRACH and/or PUSCH repetition transmission (i.e., MsgA repetition transmission) performed on a RO and/or PO resource corresponding to the repetition level determined by the UE or the repetition level directly indicated by the base station. As described above, the repetition level of the UE identified by the base station may be used for the base station to determine an MsgB (or RAR or contention resolution message) repetition transmission method.

Alternatively, RO and/or PO corresponding to different repetition levels may overlap each other. That is, a repetition level may not be distinguished only with RO and/or PO resources alone. For example, although separate RO and/or PO are to be set for each repetition level, some ROs and/or POs may be overlappingly set for different repetition levels according to configurations of other signals of the entire NR system. Even in this case, to identify a repetition level from PRACH and/or PUSCH-related configuration, at least one of a preamble index, a preamble group, and a PUSCH DMRS resource may be separately configured for each repetition level. In this case, although the base station is unaware of a repetition level of the corresponding UE only with RO and/or PO resources that receive PRACH and/or PUSCH, the repetition level of the corresponding UE may be determined based on at least one of the preamble index, the preamble group, and the PUSCH DMRS resource.

Example 4

A start RO selection method is described.

As described above, when the repetition level is determined, the UE may select a resource corresponding to the determined repetition level (e.g., RO, preamble (e.g., preamble group and index), PO, PUSCH DMRS resource (e.g., DMRS port and sequence)) and may perform a PRACH and/or PUSCH transmission (i.e., MsgA transmission) on the selected resource.

Here, the base station needs to be aware of a unit (or, time domain granularity or resolution) of the PRACH and/or PUSCH repetition transmission performed by the UE in advance. If the repetition transmission of the UE is allowed at a predetermined point in time, a collision probability of repetition transmissions of different UEs may increase. Therefore, it should be predefined such that the same assumption is applied between the base station and the UEs for start and end of the repetition transmission.

In the random access procedure of the existing NR UE, a definition is made such that the base station expects PRACH and PUSCH reception based on a single RO for PRACH transmission and a single PO for PUSCH transmission. In particular, the base station may not be aware of a RO in which the PRACH is to be transmitted in advance regarding PRACH reception. Therefore, the base station attempts blind reception in all the configured possible ROs.

Meanwhile, a RO and/or a PO for repetition transmission according to the present disclosure may define a T_RO set or a T_RO group that includes at least one time domain RO (hereinafter, T_RO) corresponding to the number of repetition transmissions corresponding to the repetition level based on a start RO. Here, T_ROs included in a single T_RO set may include T_ROs consecutive in time and may include T_ROs inconsecutive in time. T_ROs included in the T_RO set may be specified by an offset, an interval, a pattern, and the like. In the following examples, a start point of the T_RO set is referred to as a start RO and a method of determining the same is described.

Example 4-1

A method of randomly selecting a start RO from among candidate start Ros associated with a selected SSB is described.

FIG. 19 illustrates an example of a start RO selection method to which the present disclosure may apply.

The UE may determine a start RO value for start of a repetition transmission from among ROs associated with an optimal SSB/CSI-RS selected by the UE based on ROs provided through a PRACH configuration and a repetition level determined for the UE (or a repetition level indicated to the UE by the base station). For example, the start RO may be determined as $t^{PRACH}_{startRO,SSB}$ (i.e., a start RO index per SSB) that meets a condition of the following Equation 5. When the start RO is determined, the UE may determine a PRACH repetition transmission using the number of ROs (here, including the start RO) corresponding to the number of repetition transmissions in the time domain.

In the example of FIG. 19, it is assumed that the number of PRACH repetitions is set to 2 (e.g., repetition level 1 in the example of Table 12). Also, it is assumed that FDM is set to 2, that is, the number of frequency domain ROs per T_RO (hereinafter, F_RO) is set to 2. Also, it is assumed that the number of SSBs per RO (# of SSBs per RO) is set to ⅛, that is, eight ROs are associated with a single SSB. Also, it is assumed that the number of time domain ROs (T_RO) per RACH slot is set to 6, that is, the number of T_RO present in a single RACH slot determined according to a PRACH configuration index value is 6.

In the example of FIG. 19, since six T_ROs are included in a single RACH slot and two F_ROs are included per single T_RO, a total of 12 ROs are set. Eight ROs associated with SSB1 that is an optimal SSB among the 12 ROs correspond to eight ROs in first to fourth T_ROs. A candiate start RO among the eight ROs may be determined according to the following Equation 5.

[Equation 5]

$$T_{RO,SSB} \geq t^{PRACH}_{start\ RO,SSB} * N^{PRACH}_{Repetition} \left( t^{PRACH}_{start\ RO,SSB} = 0, 1, \ldots, \left\lfloor \frac{T_{RO,SSB}}{N^{PRACH}_{Repetition}} \right\rfloor - 1 \right)$$

In Equation 5, $T_{RO,SSB}$ denotes a total number of T_ROs associated with a single SSB selected within a single RACH slot, a single association period (hereinafter, AP), or a single association pattern period (which may include at least one AP). This value may be determined from PRACH resource configuration and SSB-to-RO mapping-related configuration. For example, this value may be 1, 2, 4, 8, . . . .

Then, $N_{Repetition}^{PRACH}$ denotes the number of PRACH repetition transmissions. This value may be set through upper layer signaling of the base station as in the example of Table 12 and may be set as a value corresponding to a single repetition level that is determined based on a channel environment, UE capability, and the like. For example, this value may be 1, 2, 4, 8, 16, 32, . . . .

Then, $t_{startRO,SSB}^{PRACH}$ denotes a start RO index per SSB.

The UE may determine a candidate start RO for PRACH repetition transmission that meets the condition of Equation 5. In the example of FIG. 19, the number of T_ROs associated with SSB1, $T_{RO,SSB}$=4 and the number of repetition transmissions, $N_{Repetition}^{PRACH}$, =2. In this case, $t_{startRO,SSB}^{PRACH}$=0, 1. Since a repetition transmission needs to be performed in two T_ROs that include the start RO, a first RO (or T_RO index 0) and a third RO (or T_RO index 2) within a single AP correspond to candidate start ROs.

That is, since two candidate start ROs associated with SSB1 are present within a single AP and two F_ROs are present in each candidate start RO, the RC UE may determine one randomly selected from among a total of four candidate start ROs as the start RO. For example, UE #0 may determine a first F_RO of the third T_RO as the start RO and UE #1 may determine a second F_RO of the first T_RO as the start RO. Each UE may perform two PRACH repetition transmissions in the same frequency resource as that of the start RO and a subsequent time resource.

The existing NR UE may randomly select a single RO from among ROs (e.g., eight ROs) associated with a selected single SSB and may perform a PRACH transmission. Unlike this, the RC UE may select one from among candidate start ROs that belong to a limited T_RO set in consideration of a PRACH repetition transmission. Therefore, the base station may verify whether a PRACH transmission is performed based on which RO among ROs associated with the number of repetition transmissions. Accordingly, a PRACH repetition occasion corresponding to each number of PRACH repetition transmissions (or repetition level) may be defined.

Figure 20:
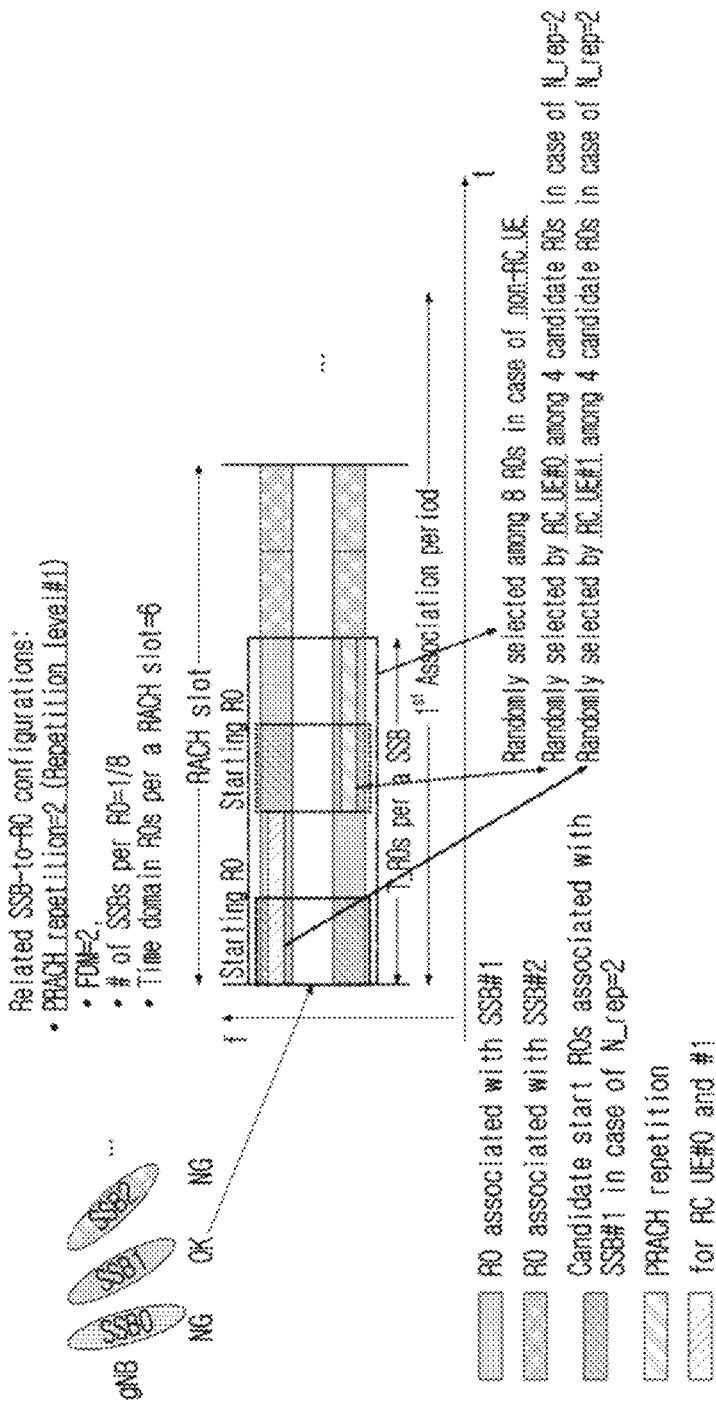

FIG. 20 illustrates an additional example of a start RO selection method to which the present disclosure may apply.

The example of FIG. 20 corresponds to a case in which ROs associated with a single SSB are included in a plurality of RACH slots within a single AP.

In the example of FIG. 20, it is assumed that the number of PRACH repetitions is set to 4, FDM is set to 2, the number of SSBs per RO (# of SSBs per RO) is set to ⅛, and the number of time domain ROs (T-ORs) per RACH slot is set to 2.

In this case, since $T_{RO,SSB}$=4 and $N_{Repetition}^{PRACH}$=4 $t_{startRO,SSB}^{PRACH}$=0 is determined according to Equation 5. In this case, a first T_RO among T_ROs associated with a single SSB within a single AP corresponds to a candidate start RO. Since two F_RO are present per a single T_RO, the UE may randomly select one from among a total of two candidate start ROs. In the example of FIG. 20, UE #0 may determine a first F_RO of a first T_RO of a first RACH slot as a start RO and may perform four PRACH repetition transmissions in the same frequency resource as that of the start RO and a subsequent time resource.

Figure 21:
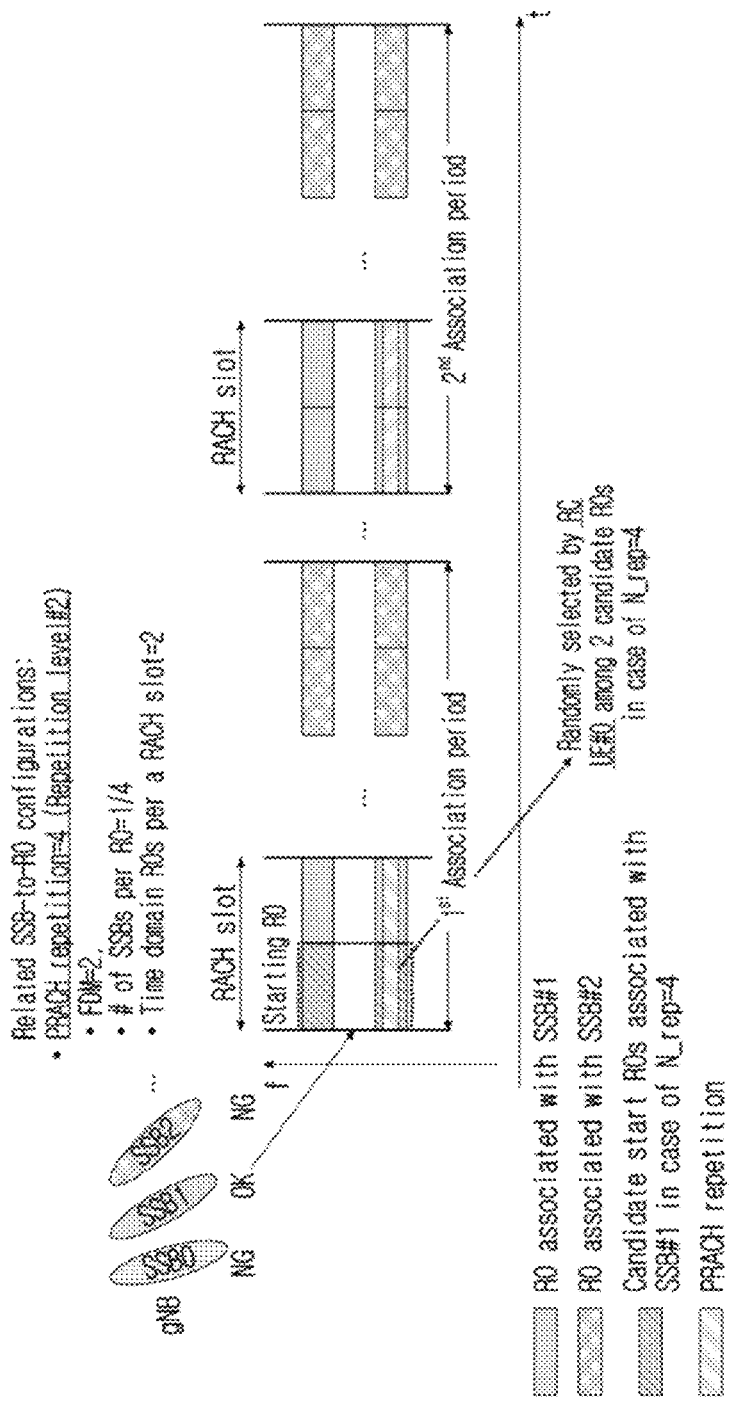

FIG. 21 illustrates an additional example of a start RO selection method to which the present disclosure may apply.

A PRACH repetition transmission may be limited to be performed within a single AP, or may be performed over a plurality of APs.

The example of FIG. 21 represents a case in which ROs associated with a single SSB is included in a plurality of APs (e.g., two APs) within a single association pattern period.

In the example of FIG. 21, it is assumed that the number of PRACH repetitions is set to 4, FDM is set to 2, # of SSBs per RO is set to ¼, and the number of time domain ROs (T_ROs) per RACH slot is set to 2.

In this case, since $T_{RO,SSB}$=4 and $N_{Repetition}^{PRACH}$=4, $t_{startRO,SSB}^{PRACH}$=0 is determined according to Equation 5. In this case, a first T_RO among T_ROs associated with a single SSB within a single association pattern period corresponds to a candidate start RO. Since two F_ROs are present per single T_RO, the UE may randomly select one from among a total of two candidate start ROs. In the example of FIG. 21, UE #0 may determine a first F_RO of a first T_RO of a first RACH slot of a first AP and may perform four PRACH repetition transmissions in the same frequency resource as that of the start RO and a subsequent time resource.

FIG. 22 illustrates an additional example of a start RO selection method to which the present disclosure may apply.

The example of FIG. 22 corresponds to an additional example in which PRACH repetition transmissions are performed across 2 APs and a start RO is positioned within a first AP and ROs for a subsequent repetition transmission is positioned in a second AP.

In the example of FIG. 22, it is assumed that the number of PRACH repetitions is set to 4, FDM is set to 2, the number of SSBs per RO is set to ⅛, and the number of time domain ROs (T_ROs) per a RACH slot is set to 6. Also, in the example of FIG. 22, it is assumed that a value of a start RO offset is set to 3.

In this case, since $T_{RO,SSB}$=8 and $N_{Repetition}^{PRACH}$=4, $t_{startRO,SSB}^{PRACH}$=0, 1 is determined according to Equation 5. Since repetition transmissions are performed in four T_ROs that include the start RO, T_RO indexes 0 and 4 correspond to candidate start ROs. Here, if the start RO offset value of 3 is additionally applied, T_RO indexes 3 and 7 are derived. Among them, since the T_RO index 7 and four consecutive T_ROs including the same are out of available ROs, the T_RO index 3 (i.e., a fourth T_RO of a first RACH slot of a first AP) finally becomes a candidate start RO. Since two F_ROs are present per a T_RO, the UE may randomly select one from among a total of two candidate start ROs. In the example of FIG. 22, the RC UE may determine a second F_RO of a fourth T_RO of the first RACH slot of the first AP as the start RO and may perform four PRACH repetition transmissions in the same frequency resource as that of the start RO and a subsequent time resource.

When the RC UE and non-RC UEs (or existing NR UEs) coexist in a cell, a PRACH configuration and an SSB (or CSI-RS)-to-RO mapping configuration may be commonly or separately provided to the RC UE and the non-RC UEs through upper layer signaling from the base station. If configured commonly, the RC UE and the non-RC UE among the same shared ROs select RO(s) for a PRACH transmission according to different methods. If configured separately, RO(s) for each PRACH transmission is selected from among the separate ROs.

Example 4-2

While the aforementioned example 4-1 provides an independent RO and/or PO configuration for each repetition level, example 4-2 provides a separate PO and/or RO configuration for each repetition level based on a RO and/or PO configured through a single PRACH and/or PUSCH resource configuration.

Figure 23:
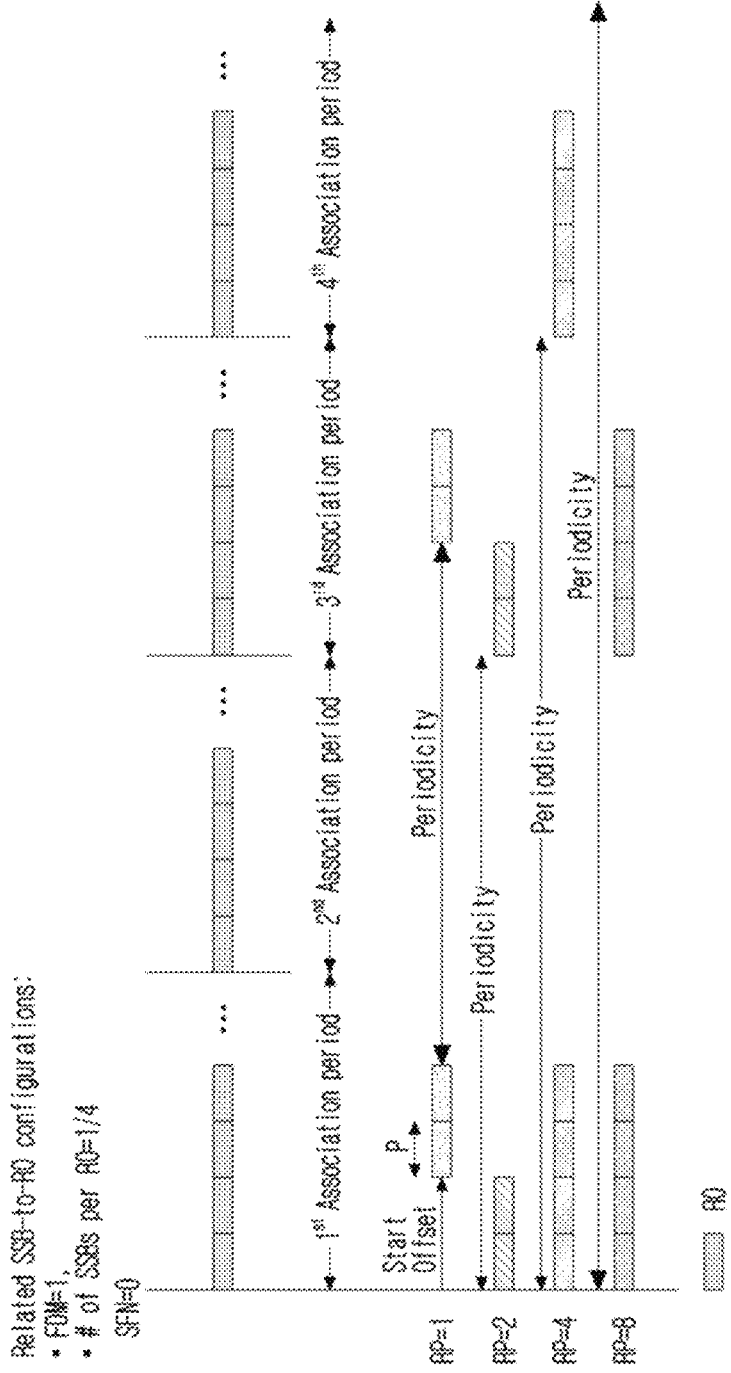

FIG. 23 illustrates an additional example of a start RO selection method to which the present disclosure may apply.

A single common PRACH resource configuration and SSB-to-RO mapping configuration may be applied to a plurality of repetition levels. A single common configuration may be applied to all repetition levels configurable for the UE. Alternatively, separate configurations may be applied to at least one repetition level of a first group and at least one repetition level of a second group.

For example, in the example of FIG. 23, it is assumed that FDM is set to 1, that is, the number of frequency domain ROs (hereinafter, F_ROs) per T_RO is 1. Also, it is assumed that the number of SSBs per RO (# of SSBs per RO) is set to ¼, that is, four ROs are associated with a single SSB.

Additionally, a separate start offset and/or period may be set for each of the number of repetition transmissions 1, 2, 4, and 8 (or repetition level indexes 0, 1, 2, and 3). The start offset may be set based on SFN=0. The period may be set based on a T_RO unit, a RACH slot unit, a PRACH configuration period unit, or an association period (AP) unit. If a period value is not set for the UE, the UE may apply the number of PRACH repetitions as a period value.

For example, in the example of FIG. 23, if the number of repetition transmissions is 1 (RP=1), the start offset may be set to 2 T_ROs and the period may be set to 2 APs. If RP=2, the start offset may be set to 0 and the period may be set to 2 APs. If RP=4, the start offset may be set to 0 and the period may be set to 3 APs. If RP=8, the start offset may be set to 0 and the period may be set to 8 T_ROs. If the period value is not set or if the period value is 0, a repetition transmission may be performed in all T_ROs after the offset. In this case, after the offset, the start RO is determined by the number of T_RO repetition transmissions in all T_ROs and, as a result, the repetition transmission is performed on a consecutive RO in the time domain. If FDM>1 is set, the UE performs a random selection between FDM ROs in the start RO and performs a repetition transmission based on the same frequency or a predetermined pattern (e.g., a frequency hopping pattern).

In this case, although at least one RO is associated with an SSB, the RC UE may not perform a random selection and may perform a repetition transmission in ROs indicated by the base station according to a corresponding repetition level. If a plurality of repetition levels is set in the same RO, the repetition levels may be distinguished by differently setting a different preamble group and/or preamble index for each repetition level. Therefore, even when the base station receives a preamble in a RO with overlapping repetition levels, the base station may identify a repetition level selected by the RC UE based on a group and/or index of the corresponding preamble.

Figure 24:
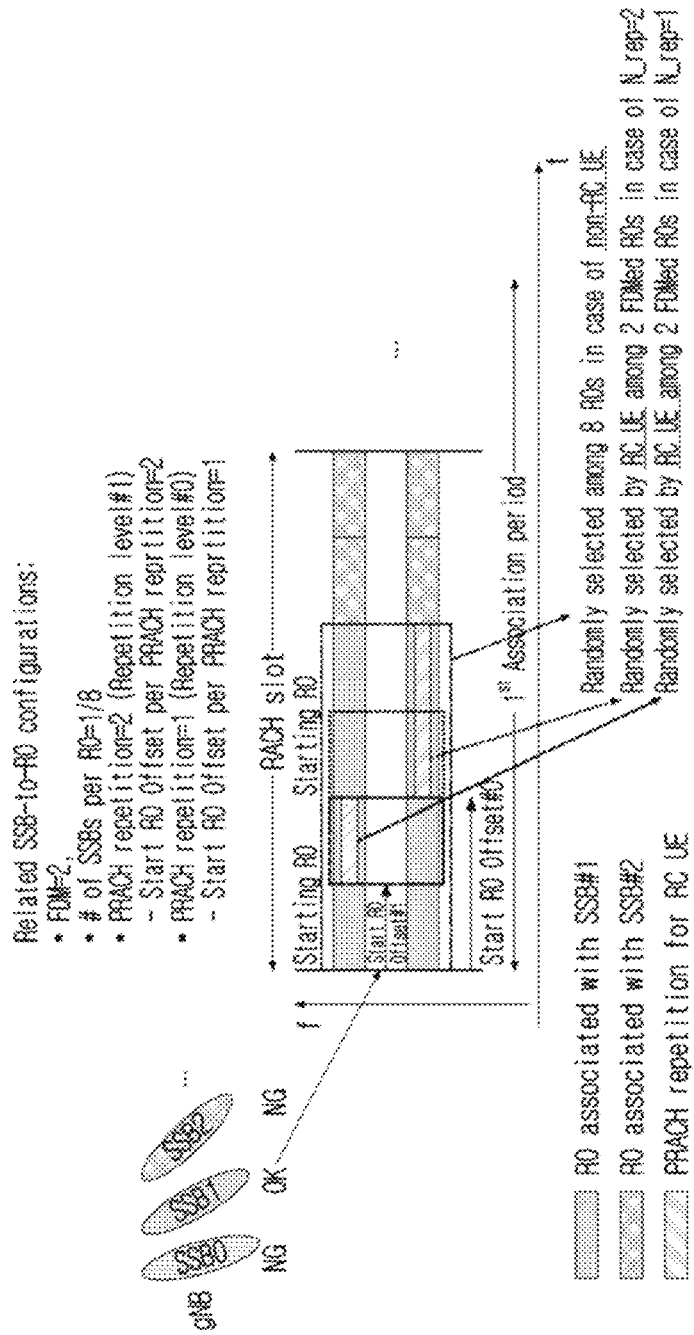

FIG. 24 illustrates an additional example of a start RO selection method to which the present disclosure may apply.

A single common PRACH resource configuration and SSB-to-RO mapping configuration may be applied to a plurality of repetition levels. For example, in the example of FIG. 24, a PRACH resource configuration and an SSB-to-RO mapping configuration may be commonly applied to the number of repetition transmissions 1 and 2. Also, FDM may be set to 2 and the number of SSBs per RO (# of SSBs per RO) may be set to ⅛. Meanwhile, the PRACH resource configuration and the SSB-to-RO mapping configuration may be provided for additional repetition levels (e.g., the number of repetition transmissions 4 and 8), which may be provided separately from configuration for the number of repetition transmissions 1 and 2.

Additionally, a separate start offset and/or period may be set for each of the number of repetition transmissions 1 and 2. For example, in the example of FIG. 24, if RP=1 (or repetition level index 0), a start offset may be set to 1 T_RO and a period may be set to at least one AP. If RP=2 (or repetition level index 1), the start offset may be set to 2 T_RO sand the period may be set to at least one AP.

The UE may determine ROs associated with optimal SSB1 that is selected through downlink SSB measurement. In the example of FIG. 24, eight ROs may correspond to four consecutive T_ROs and two F_ROs per T_RO. If a first RC UE selects RP=1, the first RC UE may perform a PRACH transmission by randomly selecting one (e.g., a second F_RO) from among two FDM ROs of a second T_RO. If a second RC UE selects RP=2, the second RC UE may randomly select one (e.g., a first F_RO) from among two FDM ROs of a third T_RO and may perform two PRACH repetition transmissions in a subsequent T_RO at the same frequency location.

Example 4-3

Described is an RO selection method according to a repetition level when a PRACH repetition transmission is limited within a single AP (i.e., if the PRACH repetition transmission is not allowed across a plurality of APs).

Figure 25:
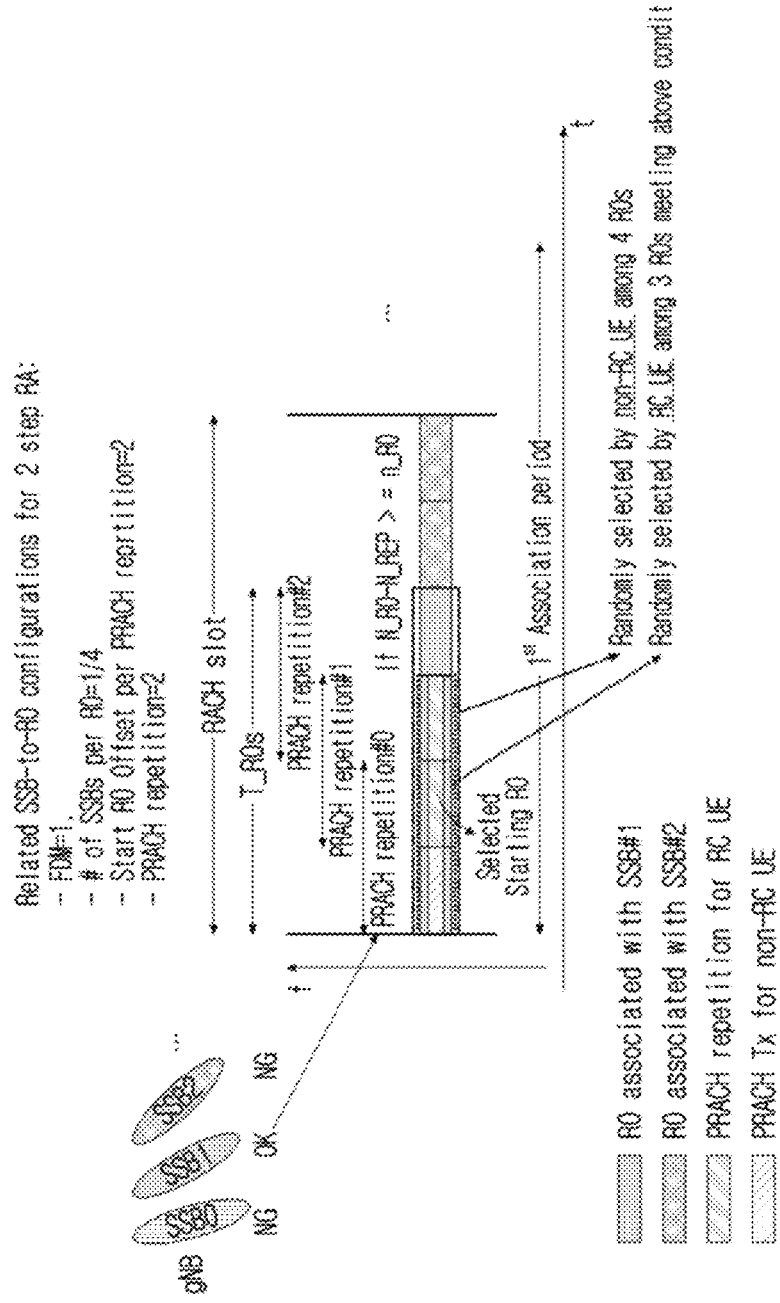

FIG. 25 illustrates an additional example of a start RO selection method to which the present disclosure may apply.

A single common PRACH resource configuration and SSB-to-RO mapping configuration may be applied to a plurality of repetition levels. For example, in the example of FIG. 25, the PRACH resource configuration and the SSB-to-RO mapping configuration may be set to be commonly applied to the number of repetition transmissions, 1, 2 and 4. Also, FDM may be set to 1 and the number of SSBs per RO (# of SSBs per RO) may be set to ¼.

Additionally, the UE may randomly select a start RO from among one or more T_ROs that meet a predetermined condition. For example, the UE may determine a T_RO that meets $N_{RO} - N_{rep} \geq n_{RO}$ as a candidate start RO. Here, $N_{RO}$ denotes a total number of T_ROs associated with a single SSB within a single AP. $N_{rep}$ denotes the number of PRACH repetition transmissions selected by the UE, and $n_{RO}$ denotes an index (0, 1, 2, 3, . . . ) of T_RO associated with a single SSB within a single AP. If a plurality of T_ROs meets this condition or if a plurality of F_ROs is set for each T_RO, the UE may randomly select one of them as a start RO. Also, the $N_{RO}$ may be defined as a total number of T_ROs associated with a single SSB index in a plurality of APs or within a single association pattern period. For example, the UE may select an $n_{RO}$ index (i.e., start RO) that meets the condition within the number of T_ROs associated with a single SSB in two APs. Also, the number of APs in which the operation is to be defined may be determined in advance or may be configured through upper layer signaling of the base station.

In the example of FIG. 25, the UE may determine four ROs associated with optimal SSB1 selected through downlink SSB measurement. That is, $N_{RO}=4$ is assumed. Also, it is assumed that the UE selects the number of repetition transmissions as 2. That is, $N_{rep}=2$ is assumed. Therefore, the UE may determine T_ROs ($=n_{RO}$) having indexes of 2 (=4−2) or less, that is, 0, 1, and 2 (i.e., first, second, and third T_ROs) as candidate start ROs. Therefore, the UE may determine one (e.g., the second T_RO corresponding to the T_RO index 1) from among the candidate start ROs as the start RO and may perform two PRACH repetition transmissions that include a subsequent T_RO. If the number of repetition transmissions selected by the UE is 4 (i.e., $N_{rep}$=4), the UE determines that a candidate T_RO (i.e., the first T_RO having an index of 4−4=0 or less) is present. Therefore, the UE may determine the corresponding T_RO as the start RO and may perform four PRACH repetition transmissions that include subsequent three T_ROs.

As described above, the resource selection method of FIG. 25 may be applied between one or more APs. This is because the number of ROs associated with a single SSB and a time frequency location of the resource may vary according to a PRACH resource configuration and a related SSB-RO mapping configuration of the base station. Accordingly, a preamble repetition transmission across at least one AP may be considered according to a configuration value and a repetition level (or the number of repetition transmissions). Also, the above method may be applied within a single association pattern period or at least one association pattern period in a different manner.

In the aforementioned examples, it may be assumed that the same preamble group and/or preamble index are used in each of a start RO and at least one subsequent RO in which PRACH repetition transmissions are performed. Alternatively, the preamble group and/or the preamble index may hop for each of the number of repetition transmissions, RO, and the RACH slot.

Example 5

A method of selecting a start PO based on a selected RO for a PUSCH repetition transmission is described.

As described above in the aforementioned examples, various methods may be applied for the PRACH repetition transmission. Therefore, determination of a PRACH repetition level (or the number of repetition transmissions), selection of a RO used for a start RO and a repetition transmission, and/or determination of a preamble (preamble group and/or preamble index) may be performed. Additionally, for MsgA transmission of the RC UE, a PUSCH repetition transmission needs to be supported. To this end, the method of selecting the start PO needs to be defined.

In the case of the existing NR UE, a PUSCH slot may be determined based on a predetermined slot offset (, which may be defined based on an SCS of an active BWP) based on a RACH slot for a PRACH transmission. Also, a resource for PUSCH transmission may be determined based on a mapping relation between a RO and a PO and a mapping relationship between a PRACH preamble and a PUSCH DMRS resource (port and/or sequence).

Meanwhile, to effectively support the MsgA repetition transmission of the RC UE, an existing PO selection method may need to be enhanced. Here, a repetition level index determined by the RC UE may be mapped to the number of PRACH repetition transmissions and/or the number of PUSCH repetition transmissions (see Table 12). In particular, the number of PRACH repetition transmissions and the number of PUSCH repetition transmissions may be independently set. For example, repetition level index 2 may be mapped to the number of PRACH repetition transmissions, 4, and the number of PUSCH repetition transmissions, 2.

Figure 26:
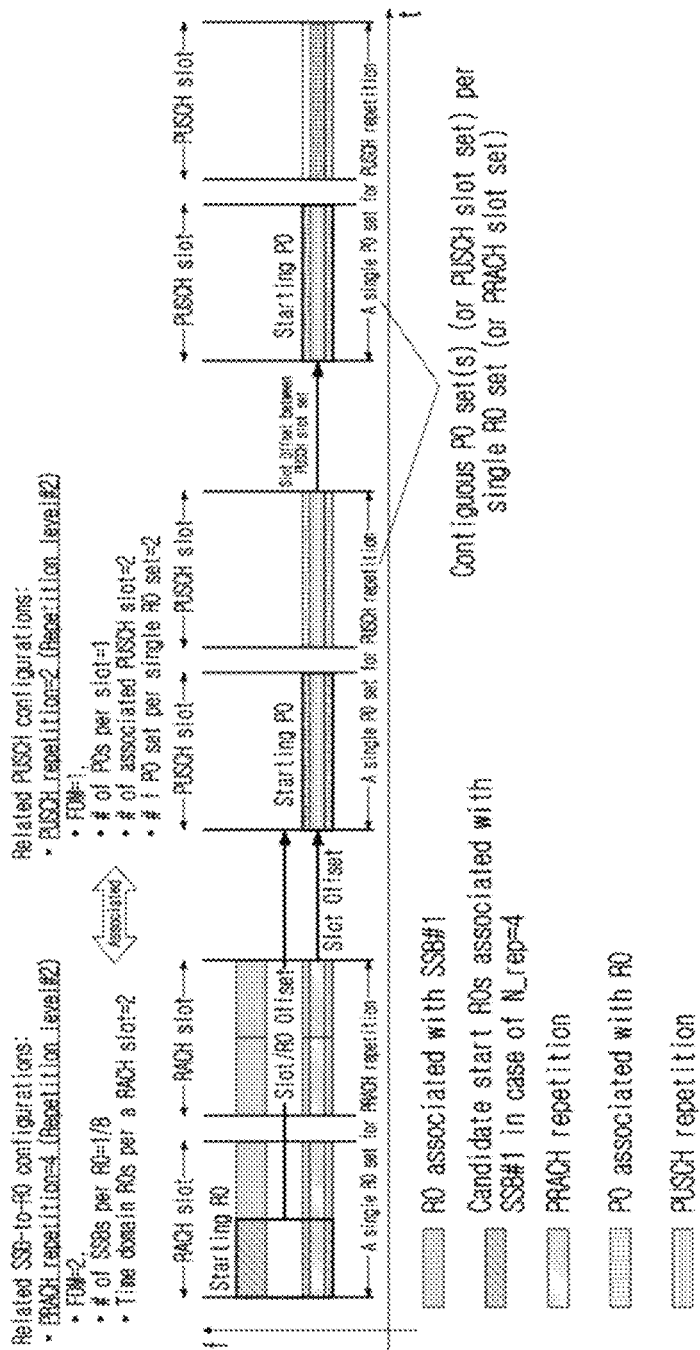
FIGS. 26 to 28 illustrate examples of a mapping relationship between a RACH slot set and a PUSCH slot set to which the present disclosure may apply.

FIG. 26 illustrates an example of a mapping relationship between a RACH slot set and a PUSCH slot set to which the present disclosure may apply.

For example, a mapping relationship between at least one RO and/or at least one RACH slot for a PRACH repetition transmission and at least one slot for a PUSCH repetition transmission may be configured. For example, for a single MsgA repetition transmission, the PRACH repetition transmission and the PUSCH repetition transmission may be associated with each other and a resource for the PRACH repetition transmission and a resource for the PUSCH repetition transmission may be associated with each other. Therefore, as the UE selects the resource for the PRACH repetition transmission, the resource for the PUSCH repetition transmission may be determined according to the mapping relationship.

Dissimilar to an association relationship between the PRACH transmission and the PUSCH transmission of the existing NR UE (e.g., see FIG. 11), for the PRACH repetition transmission and the PUSCH repetition transmission of the RC UE, a RACH slot set (or a RO set or a T_RO set) that includes at least one RO associated with a single PRACH repetition transmission attempt (i.e., at least one PRACH repetition transmission) included in a single MsgA repetition transmission attempt may be defined and a PUSCH slot set (or a PO set or a T_PO set) that includes at least one PO associated with a single PUSCH repetition transmission attempt (i.e., at least one PUSCH repetition transmission) included in the single MsgA repetition transmission attempt may be defined. Also, at least one PUSCH slot set that maps for each RACH slot set may be defined. Also, PUSCH slot sets that map for different RACH slot sets may be the same, may partially overlap, and may differ from each other.

For example, a relative slot offset value (, which may be defined based on an SCS of an active BWP) may be indicated based on a first or last RACH slot of a RACH slot set and accordingly, a first PUSCH slot that includes a first PO for the PUSCH repetition transmission may be determined.

When a plurality of different PUSCH slot sets is mapped to a single RACH slot set, locations of the plurality of PUSCH slot sets may be determined based on a slot offset value between PUSCH slot sets. The offset value may be set as an upper layer parameter. For example, if the offset value=0, the plurality of PUSCH slot sets may be positioned in consecutive PUSCH slots. If the offset value is 1 or more, the plurality of PUSCH slot sets may be spaced part and positioned in the time domain. The offset may be applied such that a RO for PRACH repetition transmission may be performed between PUSCH repetition transmissions, when a large amount of time is used for the PUSCH repetition transmissions. Alternatively, locations of the plurality of different PUSCH slot sets may be set based on a single RACH slot set.

Also, a single RACH slot set may be mapped to N (N=1, 2, 3, . . . ) PUSCH slot sets. If the number of POs and PUSCH DMRS resources (ports/sequences) is less than the number of ROs and preamble resources (groups/indexes), a single RACH slot set may be mapped to the plurality of PUSCH slot sets. Alternatively, M RACH slot sets may be mapped to N PUSCH slot sets. Here, M and N may be independent integers of 1 or more. Also, M≤N. This mapping relationship may be set to the UE by the base station through upper layer signaling.

In the example of FIG. 26, the repetition level index determined by the RC UE is 2, which may correspond to a case in which the number of PRACH repetition transmissions is 4 and the number of PUSCH repetition transmissions is 2.

Also, it is assumed that, in relation to the PRACH repetition transmission, FDM is set to 2, that is, the number of frequency domain ROs (hereinafter, F_ROs) per T_RO is 2. Also, it is assumed that the number of SSBs per RO is set to ⅛, that is, eight ROs are associated with a single SSB. Also, it is assumed that the number of T_ROs per RACH slot is 2. Also, a single RACH slot set (or RO set) may include two RACH slots that include four T_ROs for four PRACH repetition transmissions.

Then, it is assumed that, in relation to the PUSCH repetition transmission, FDM is set to 1, that is, the number of frequency domain POs (hereinafter, F_POs) per T_PO is 1. Also, it is assumed that the number of associated PUSCH slots is set to 2, that is, the number of associated PO sets per a single RO set is 2, that is, a single RACH slot set is mapped to two PUSCH slot sets. Also, it is assumed that a single PUSCH slot set (or a PO set) includes two PUSCH slots corresponding to 2 T_POs for two PUSCH repetition transmissions.

In this case, a start point of the PUSCH slot set may be determined according to a slot offset value, based on a start RO of the RACH slot set (i.e., a first T_RO of a first RACH slot) or a last RO (i.e., a second T_RO of a second RACH slot). Also, a time domain interval between two PUSCH slot sets that are mapped to a single RACH slot may be determined based on a slot offset value between PUSCH slot sets. Alternatively, locations of two PUSCH slot sets may be determined according to the offset value based on the start RO.

Therefore, the RC UE may determine a first F_RO from among candidate start ROs of two F_ROs of the first T_RO among eight ROs (i.e., a RO set) within the RACH slot set as a start RO and may perform four PRACH repetition transmissions that include subsequent ROs at the same frequency location.

Also, the RC UE may select one from among two candidate start POs of two PUSCH slot sets that are mapped to the RACH slot set (i.e., a PO of a first PUSCH slot of a first PUSCH slot set and a PO of a first PUSCH slot of a second PUSCH slot set) and may perform two PUSCH repetition transmissions in the start PO and a subsequent PO.

In the aforementioned examples, it may be assumed that the same preamble group and/or preamble index are used in each of the start RO and at least one subsequent RO in which PRACH repetition transmissions are performed. Alternatively, the preamble group and/or the preamble index may hop for each of the number of repetition transmissions, RO, and the RACH slot within a single RACH slot set (or RO set).

Figure 27:
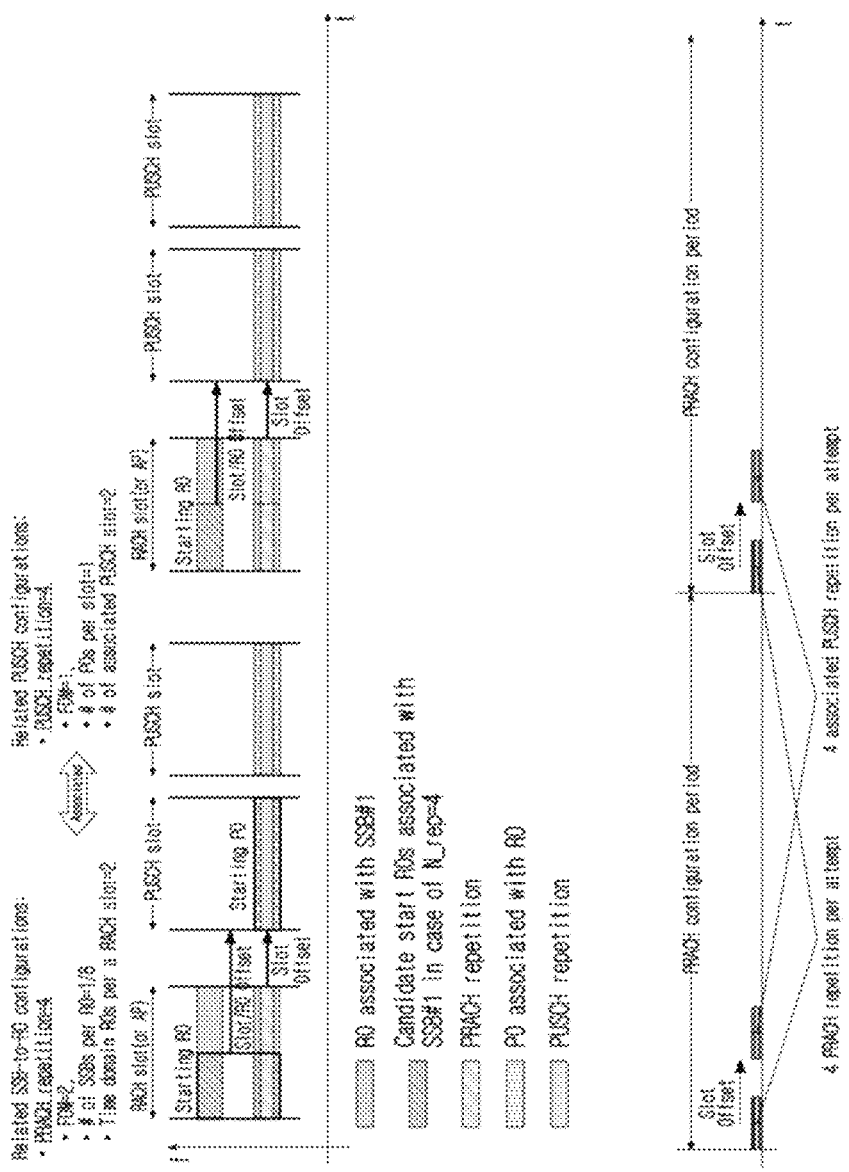

FIG. 27 illustrates an additional example of a mapping relationship between a RACH slot set and a PUSCH slot set to which the present disclosure may apply.

In the example of FIG. 27, it is assumed that the number of PRACH repetition transmissions determined by the RC UE is 4. Also, it is assumed that FDM is set to 2, the number of SSBs per RO is set to ⅛, and the number of T_ROs per RACH slot is 2. Also, a single RACH slot set (or a RO set) may include two RACH slots (or APs) that include two T_ROs for accommodating four PRACH repetition transmissions.

Here, a single RACH slot set may include a plurality of RACH slot subsets. The RACH slot subset may correspond to a portion of the number of PRACH repetition transmissions of the UE. In the example of FIG. 27, two PRACH repetition transmissions may be performed in a first RACH slot subset (a first RACH slot) and remaining two PRACH repetition transmissions may be performed in a second RACH slot subset (a second RACH slot). At least one PUSCH slot may be positioned between RACH slot subsets and accordingly, the RACH slot subsets may be configured in a separate form in the time domain.

Then, a case in which the number of PUSCH repetition transmissions determined by the RC UE is 4 is assumed. Also, it is assumed that the number of POs per PUSCH slot is set to 1 and the number of associated PUSCH slots per RACH slot is 2, that is, the number of PO sets per a single RO set is 1, that is, a single RACH slot set is mapped to a single PUSCH slot set. Also, it is assumed that a single PUSCH slot set (or a PO set) includes four PUSCH slots corresponding to four T_POs for accommodating four PUSCH repetition transmissions.

Here, a single PUSCH slot set may include a plurality of PUSCH slot subsets. The PUSCH slot subset may correspond to a portion of the number of PUSCH repetition transmissions of the UE. In the example of FIG. 27, two PUSCH repetition transmissions may be performed in a first PUSCH slot subset (first and second PUSCH slots) and remaining two PUSCH repetition transmissions may be performed in a second PUSCH slot subset (third and fourth PUSCH slots). At least one PRACH slot may be positioned between the PUSCH slot subsets and accordingly, the PUSCH slot subsets may be configured in a separate form in the time domain.

In this case, a start point of the first PUSCH slot subset may be determined according to a slot offset value, based on a start RO of a first RACH slot subset (i.e., a first T_RO of a first RACH slot) or a last RO (i.e., a second T_RO of the first RACH slot). Likewise, a start point of the second PUSCH slot subset may be determined according to a slot offset value, based on a start RO of a second RACH slot subset (i.e., a first T_RO of a second RACH slot) or a last RO (i.e., a second T_RO of the second RACH slot).

Therefore, the RC UE may determine a first F_RO from among candidate start ROs of two F_ROs of the first T_RO among four ROs (i.e., a first RO subset) within the first RACH slot subset as the start RO and may perform two PRACH repetition transmissions by including subsequent ROs at the same frequency location.

Also, the RC UE may select a single candidate start PO of the first PUSCH slot subset that is mapped to the first RACH slot subset (i.e., a PO of the first PUSCH slot of the first PUSCH slot subset) as the start PO and may perform two PUSCH repetition transmissions in the start PO and a subsequent PO.

Also, the RC UE may perform two PRACH repetition transmissions by including subsequent ROs at the same frequency location as that of the start RO selected from the first RACH slot subset within the second RACH slot subset.

Also, the RC UE may perform two PUSCH repetition transmissions by include subsequent POs at the same frequency location as that of the start PO selected from the first PUSCH slot within the second PUSCH slot subset.

As described above, instead of setting an associated PUSCH slot set after a RACH slot set for a single PRACH repetition transmission attempt as in the example of FIG. 26, a resource for PUSCH repetition transmission (e.g., PO, PUSCH slot) may be mapped between resources (e.g., RO, RACH slot, PRACH configuration period, AP) required for a single PRACH repetition transmission attempt as in the example of FIG. 27. This mapping relationship may be defined by the number of ROs and the number of POs for at least one repetition transmission.

The method as in the example of FIG. 26 may be applied to a case in which a PRACH resource configuration for a RACH slot is not frequently configured in the time domain. After a time domain location of a resource for a single PRACH repetition transmission attempt, a resource for a single PUSCH repetition transmission attempt may be configured. Therefore, it is difficult to expect an early termination effect.

The method as in the example of FIG. 27 may set a portion of resources for a single PUSCH repetition transmission attempt after a portion of resources for a single PRACH repetition transmission attempt is positioned in the time domain. On the side of the base station that receives an MsgA repetition transmission from the UE, if the base station succeeds in receiving a portion of repetition transmissions without receiving all the repetition transmissions, the base station may enter a preparation operation for a subsequent procedure and may minimize energy consumption of the base station.

For example, the base station may generate a response to a PRACH (e.g., RAR) and/or a response to MsgA (e.g., MsgB) based on a PRACH preamble that is successfully received in a portion (e.g., a RACH slot subset) of a single PRACH repetition transmission attempt and/or a PUSCH that is successfully received in a portion (e.g., a PUSCH slot subset) of a single PUSCH repetition transmission attempt and may transmit the generated response to the UE.

Also, after a PRACH preamble transmission in a portion (e.g., a RACH slot subset) of a single PRACH repetition transmission attempt and/or a PUSCH transmission in a portion (e.g., a PUSCH slot subset) of a single PUSCH repetition transmission attempt, the UE may attempt reception of the response (RAR and/or MsgB) from the base station (e.g., attempt to monitor a response message during a response timer initiation and a timer operation.

Also, the example of FIG. 27 represents a mapping relationship between a single PRACH repetition transmission attempt and a related single PUSCH repetition transmission. Instead of all resources for a single PUSCH repetition transmission attempt being associated after all resources for a single PRACH repetition transmission attempt are positioned in the time domain, a portion of resources (e.g., RO, preamble group and/or preamble index) for a single PRACH repetition transmission attempt and a portion of resources for a single PUSCH repetition transmission attempt (e.g., PO, PUSCH DMRS port and/or sequence) may be mapped and a remaining portion of the resources for the single PRACH repetition transmission attempt and a remaining portion of the resources for the single PUSCH repetition transmission attempt may be mapped.

Figure 28:
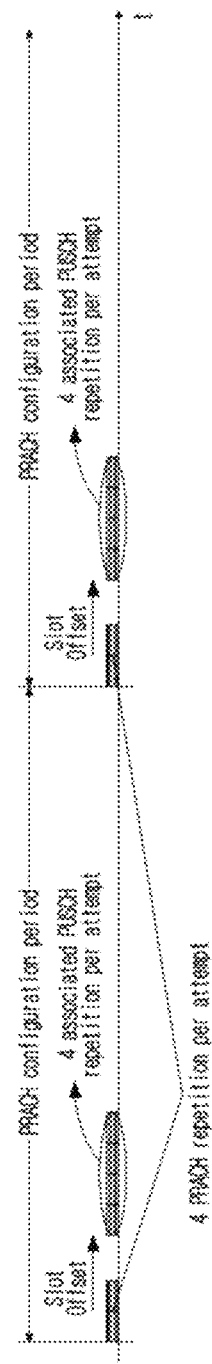

FIG. 28 illustrates an additional example of a mapping relationship between a RACH slot set and a PUSCH slot set to which the present disclosure may apply.

Dissimilar to the example of FIG. 27 in which a portion of resources for a single PRACH repetition transmission attempt and a portion of resources for a single PUSCH repetition transmission attempt are mapped, the example of FIG. 28 represents a case in which a portion of resources for a single PRACH repetition transmission attempt and all resources for a single PUSCH repetition transmission attempt are mapped. That is, a first PUSCH slot set may be associated with a first RACH slot subset and a second PUSCH slot set may be associated with a second RACH slot subset.

In the example of FIG. 28, a single RACH slot set is mapped two PUSCH slot sets. That is, resources (e.g., RO, preamble group and/or preamble index) for a single PRACH repetition transmission attempt may be associated with resources (e.g., PO, PUSCH DMRS port and/or sequence) corresponding to two PUSCH slot sets.

A configuration for PRACH repetition transmission and/or PUSCH repetition transmission or a configuration for MsgA repetition transmission according to one or more various combinations of the aforementioned examples may be set or reset through upper layer signaling (e.g., SIB1 or dedicated RRC signaling) provided from the base station to the UE. Therefore, the base station may provide a suitable resource configuration and a mapping relationship configuration for PRACH and/or PUSCH repetition transmission to the UEs in consideration of an arrangement environment of a corresponding cell and a distribution of RC UEs.

Figure 29:
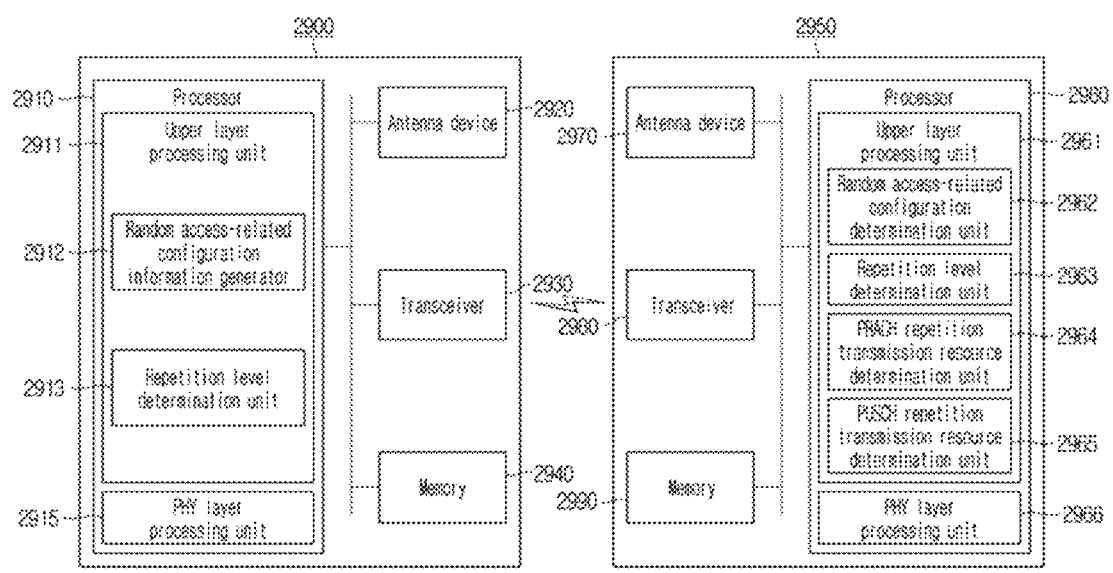
FIG. 29 is a diagram illustrating a configuration of a base station device and a terminal device according to the present disclosure.

FIG. 29 is a diagram illustrating a configuration of a base station device and a terminal device according to the present disclosure.

A base station device 2900 may include a processor 2910, an antenna device 2920, a transceiver 2930, and a memory 2940.

The processor 2910 may perform baseband-related signal processing and may include an upper layer processing unit 2911 and a physical (PHY) layer processing unit 2915. The upper layer processing unit 2911 may process an operation of a MAC layer, an RRC layer, or more upper layers. The PHY layer processing unit 2915 may process an operation (e.g., uplink received signal processing, downlink transmission signal processing, etc.) of a PHY layer. The processor 2910 may also control the overall operation of the base station device 2900, in addition to performing the baseband-related signal processing.

The antenna device 2920 may include at least one physical antenna. If the antenna device 2920 includes a plurality of antennas, multiple input multiple output (MIMO) transmission and reception may be supported. The transceiver 2930 may include a radio frequency (RF) transmitter and an RF receiver. The memory 2940 may store operation processed information of the processor 2910, software, an operating system (OS), an application, etc., associated with an operation of the base station device 2900, and may include a component, such as a buffer.

The processor 2910 of the base station device 2900 may be configured to implement an operation of a base station in the examples set forth herein.

For example, the upper layer processing unit 2911 of the processor 2910 of the base station device 2900 may include a random access-related configuration information generator 2912 and a repetition level determination unit 2913.

The random access-related configuration information generator 2912 may generate information on a resource configuration for PRACH repetition transmission or a resource configuration for PUSCH repetition transmission selectable by the terminal device 2950 based on a UE type and/or a repetition level, and may provide the configuration information to the terminal device 2950 through system information signaling or dedicated RRC signaling.

For example, resource configuration information for a PRACH repetition transmission may include a configuration for at least one of an association pattern period, an AP, a RACH slot, a RACH slot set, a RACH slot subset, a start RO, a RO set, a RO subset, a preamble group, and a preamble index, which may be selected by the terminal device 2950.

For example, resource configuration information for a PUSCH repetition transmission may include a configuration of at least one of a PUSCH slot associated with a resource configuration for PRACH repetition transmission, a PUSCH slot set, a PUSCH slot subset, a PO, a PO set, a PO subset, a slot offset, a slot offset between PUSCH slots, a PUSCH DMRS port, and a PUSCH DMRS sequence, which may be selected by the terminal device 2950.

In addition thereto, the random access-related configuration information may further include information corresponding to a RACH-ConfigCommon IE, a RACH-Config-CommonTwoStepRA IE, a MsgA-PUSCH-Config IE, and the like.

Also, random access-related configuration information may include information on a PRACH repetition transmission resource and/or a PUSCH repetition transmission resource common or individually set for each repetition level.

The repetition level determination unit 2913 may receive a PUSCH repetition transmission corresponding to a portion of a random access preamble (or PRACH) and/or MsgA received from the terminal device 2950, and may determine a repetition level applied by the terminal device 2950 based on the PRACH repetition transmission resource and/PUSCH repetition transmission resource.

The base station device 2900 may provide an operation suitable for a corresponding UE in a subsequent random access procedure by considering a type and a repetition level of the terminal device 2950 that attempts a random access.

The terminal device 2950 may include a processor 2960, an antenna device 2970, a transceiver 2980, and a memory 2990.

The processor 2960 may perform baseband-related signal processing and may include an upper layer processing unit 2961 and a PHY layer processing unit 2966. The upper layer processing unit 2961 may process an operation of a MAC layer, an RRC layer, or more upper layers. The PHY layer processing unit 2965 may process an operation (e.g., downlink received signal processing, uplink transmission signal processing, etc.) of a PHY layer. The processor 2960 may also control the overall operation of the terminal device 2950 in addition to performing the baseband-related signal processing.

The antenna device 2970 may include at least one physical antenna. If the antenna device 2970 includes a plurality of antennas, MIMO transmission and reception may be supported. The transceiver 2980 may include an RF transmitter and an RF receiver. The memory 2990 may store operation processed information of the processor 2960, software, an OS, an application, etc., associated with an operation of the terminal device 2950, and may include a component, such as a buffer.

The processor 2960 of the terminal device 2950 may be configured to implement an operation of a UE in the examples set forth herein.

For example, the upper layer processing unit 2961 of the processor 2960 of the terminal device 2950 may include a random access-related configuration determination unit 2962, a repetition level determination unit 2963, a PRACH repetition transmission resource determination unit 2964, and a PUSCH repetition transmission resource determination unit 2965.

The random access-related configuration determination unit 2962 may determine a configuration to be applied to the terminal device 2950 based on random access-related configuration information that is provided from the base station device 2900.

The repetition level determination unit 2963 may determine a repetition level corresponding to the number of PRACH repetition transmissions and/or the number of PUSCH repetition transmissions based on a comparison result between a measurement result value for a downlink channel and/or a signal provided from the PHY processing unit 2965 and a predetermined threshold value or based on indication information provided from the base station device 2900.

The PRACH repetition transmission resource determination unit 2964 may determine a PRACH repetition transmission resource (e.g., at least one of an association pattern period, an AP, a RACH slot, a RACH slot set, a RACH slot subset, a start RO, a RO set, a RO subset, a preamble group, and a preamble index) based on the repetition level applied to the terminal device 2950 and the random access-related configuration information.

The PUSCH repetition transmission resource determination unit 2965 may determine at least one of a PUSCH slot for PUSCH repetition transmission associated with the determined PRACH transmission resource, a PUSCH slot set, a PUSCH slot subset, a PO, a PO set, a PO subset, a slot offset, a slot offset between PUSCH slots, a PUSCH DMRS port, and a PUSCH DMRS sequence.

The PHY layer processing unit 2966 may perform a PRACH repetition transmission and/or a PUSCH repetition transmission to the base station device 2900 based on the PRACH repetition transmission resource and/or the PUSCH repetition transmission resource determined by the upper layer processing unit 2961.

Description made above related to a base station and a UE in examples of the present disclosure may apply alike to an operation of the base station device 2900 and the terminal device 2950 and repeated description is omitted.

While the exemplary method of the present disclosure is described as a series of operations, for clarity of description, this does not limit the order of steps. When needed, the steps may be performed at the same time or in a different order. In order to implement the method according to the present disclosure, the exemplary method may further include additional steps, include the remaining steps except for some steps, or may include additional steps other than some steps.

The various examples herein are to explain the representative aspects of the present disclosure instead of describing all the possible combinations and matters described in the various examples may independently apply or may apply through at least two combinations thereof.

Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes a software or machine executable instructions (for example, operating system, application, firmware, program, etc.) for enabling to implement operations according to the methods of the various examples, and a device or a non-transitory computer-readable medium executable on a computer storing such a software or instructions. Instructions available to program a processing system that performs features described herein may be stored on/in a storage medium or a computer-readable storage medium and the features described herein may be implemented using a computer program product that includes such storage medium. Storage media may include a high-speed random access memory, such as dynamic random access memory (DRAM), static RAM (SRAM), DDR RAM, or other random access solid state memory devices, and without being limited thereto, may include non-volatile memory, such as at least one magnetic disk storage device, optical disk storage device, flash memory device, or other non-volatile solid stage devices. Memory optionally includes at least one storage device remotely present from processor(s). Memory or, alternately, non-volatile memory device(s) in memory may include non-transitory computer-readable storage medium. Features described herein may be arbitrarily stored in one of machine-readable media to control hardware of the processing system. The processing system may be integrated into software and/or firmware that interlocks with other mechanisms using results according to the examples of the present disclosure. Such software or firmware may include an application code, a device driver, an OS, and an execution environment/container, but is not limited thereto.

Examples of the present disclosure may apply to various wireless communication systems.

What is claimed is:

1. A method comprising:
   receiving, by a wireless user device, configuration information indicating:
      a plurality of resources for repetition of physical uplink shared channel (PUSCH) transmission of a random access procedure;
      a threshold associated with repetition of PUSCH transmission of the random access procedure;
      at least one first preamble resource for a preamble transmission associated with repetition of PUSCH transmission of the random access procedure; and
      at least one second preamble resource for a preamble transmission associated with a PUSCH transmission that is not repeated;
   based on a channel measurement and the threshold, selecting, among the at least one first preamble resource and the at least one second preamble resource, a random access resource of the at least one first preamble resource for a preamble transmission of the random access procedure;
   transmitting, via the random access resource of the at least one first preamble resource, a preamble; and
   after transmitting the preamble, performing, via the plurality of resources, repetition of PUSCH transmission of the random access procedure.

2. The method of claim 1, further comprising:
   determining, based on the channel measurement indicating a measured signal value being less than the threshold, repetition of PUSCH transmission of the random access procedure.

3. The method of claim 2, wherein the channel measurement is associated with at least one of:
   a reference signal received power; or
   a pathloss.

4. The method of claim 1, wherein the configuration information further indicates a number of repetition of PUSCH transmission of the random access procedure.

5. The method of claim 1, wherein the configuration information further indicates a plurality of PUSCH occasions for repetition of PUSCH transmission of the random access procedure.

6. The method of claim 1, wherein the random access procedure is a contention-based random access procedure,
   wherein the preamble is Msg1 of a four-step random access, and
   wherein repetition of PUSCH transmission of the random access procedure is repetition of Msg3 transmission of the four-step random access.

7. The method of claim 1, wherein the preamble is MsgA preamble of a two-step random access, and wherein repetition of PUSCH transmission of the random access procedure is repetition of MsgA PUSCH transmission of the two-step random access.

8. The method of claim 1, wherein the configuration information is associated with one or more wireless user devices having a reduced capability.

9. The method of claim 1, wherein the configuration information is received via radio resource control (RRC) signaling or a system information block 1 (SIB1).

10. The method of claim 1, further comprising:
    determining, based on a comparison of a reference signal received power of a reference signal and the threshold, a level of repetition of PUSCH transmission of the random access procedure.

11. The method of claim 1, further comprising:
    determining repetition of preamble transmission of the random access procedure.

12. The method of claim 1, further comprising:
    receiving a random access response responsive to the preamble, wherein the random access response indicates parameter information for PUSCH transmission of the random access procedure,
    wherein the performing repetition of PUSCH transmission of the random access procedure comprises performing, based on the random access response, repetition of PUSCH transmission of the random access procedure,
    wherein the at least one first preamble resource is at least dedicated preamble resource configured for a preamble transmission associated with repetition of PUSCH transmission, and
    wherein the at least one first preamble resource comprises at least one of:
       a dedicated preamble random access occasion configured for a preamble transmission associated with repetition of PUSCH transmission,
       a preamble group configured for a preamble transmission associated with repetition of PUSCH transmission, or
       a preamble index configured for a preamble transmission associated with repetition of PUSCH transmission.

13. The method of claim 12, wherein the random access response is Msg2 of a four-step random access.

14. The method of claim 1, further comprising:
    determining, based on a number of repetition of PUSCH transmission of the random access procedure, a start PUSCH occasion (PO) and a PO subset.

15. A method comprising:
    receiving, by a wireless user device, configuration information indicating:
       a reduced capability associated with the wireless user device; and
       a threshold associated with repetition of physical uplink shared channel (PUSCH) transmission of a random access procedure;
       at least one first preamble resource for a preamble transmission associated with repetition of PUSCH transmission of the random access procedure; and
       at least one second preamble resource for a preamble transmission associated with a PUSCH transmission that is not repeated;
    based on a channel measurement and the threshold, selecting, among the at least one first preamble resource and the at least one second preamble resource, a random access resource of the at least one first preamble resource for a preamble transmission of the random access procedure;

transmitting, via the random access resource of the at least one first preamble resource, a preamble; and after transmitting the preamble, performing, via a plurality of resources, repetition of PUSCH transmission of the random access procedure.

16. The method of claim 15, further comprising:

determining, based on a channel measurement value being less than the threshold, repetition of PUSCH transmission of the random access procedure, wherein the configuration information further indicates:

the plurality of resources comprising a plurality of PUSCH occasions for repetition of PUSCH transmission of the random access procedure; and a number of repetition of PUSCH transmission of the random access procedure.

17. The method of claim 15, wherein the random access procedure is a contention-based random access procedure, wherein the preamble is Msg1 of a four-step random access, and wherein repetition of PUSCH transmission of the random access procedure is repetition of Msg3 transmission of the four-step random access.

18. The method of claim 15, wherein the preamble is MsgA preamble of a two-step random access, and wherein repetition of PUSCH transmission of the random access procedure is repetition of MsgA PUSCH transmission of the two-step random access.

19. The method of claim 15, further comprising:

determining, based on a comparison of a reference signal received power of a reference signal and the threshold, a level of repetition of PUSCH transmission of the random access procedure.

20. The method of claim 15, further comprising:

receiving a random access response responsive to the preamble, wherein the random access response indicates parameter information for PUSCH transmission of the random access procedure, wherein the performing repetition of PUSCH transmission of the random access procedure comprises performing, based on the random access response, repetition of PUSCH transmission of the random access procedure.

* * * * *